(12) United States Patent
Buller et al.

(10) Patent No.: US 12,275,189 B2
(45) Date of Patent: *Apr. 15, 2025

(54) THREE-DIMENSIONAL PRINTING SYSTEMS AND METHODS OF THEIR USE

(71) Applicant: Velo3D, Inc., Campbell, CA (US)

(72) Inventors: Benyamin Buller, Cupertino, CA (US); Zachary Ryan Murphree, San Jose, CA (US)

(73) Assignee: VELO3D, INC., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,942

(22) Filed: Aug. 21, 2023

(65) Prior Publication Data

US 2024/0066799 A1    Feb. 29, 2024

Related U.S. Application Data

(63) Continuation of application No. 18/141,527, filed on May 1, 2023, now abandoned, which is a continuation
(Continued)

(51) Int. Cl.
*B29C 64/286* (2017.01)
*B22F 10/28* (2021.01)
(Continued)

(52) U.S. Cl.
CPC ............ *B29C 64/286* (2017.08); *B22F 10/28* (2021.01); *B22F 10/322* (2021.01); *B22F 10/36* (2021.01); *B22F 12/30* (2021.01); *B22F 12/63* (2021.01); *B22F 12/67* (2021.01); *B29C 64/153* (2017.08); *B29C 64/232* (2017.08); *B29C 64/245* (2017.08); *B29C 64/25* (2017.08); *B29C 64/255* (2017.08); *B29C 64/268* (2017.08); *B29C 64/371* (2017.08); *B33Y 30/00* (2014.12); *B33Y 70/00* (2014.12); *B22F 10/32* (2021.01); *B22F 10/366* (2021.01); *B22F 10/64* (2021.01); *B22F 10/66* (2021.01); *B22F 10/77* (2021.01); *B22F 12/41* (2021.01); *B22F 12/45* (2021.01);
(Continued)

(58) Field of Classification Search
CPC ... B29C 64/286; B29C 64/153; B29C 64/214; B29C 64/232; B29C 64/245; B29C 64/25; B29C 64/255; B29C 64/268; B29C 64/371; B22F 10/28; B22F 10/32; B22F 10/322; B22F 10/36; B22F 10/36664; B22F 10/66; B22F 10/77; B22F 12/30; B22F 12/63; B22F 12/67; B22F 12/41; B22F 12/45; B22F 12/90; B33Y 30/00; B33Y 70/00

See application file for complete search history.

(56) References Cited

U.S. PATENT DOCUMENTS 10,272,525 B1 *   4/2019  Buller ................ B23K 26/0006
2006/0196852 A1 * 9/2006  Bann ...................... B23K 26/04
                                                                219/121.8
(Continued)

Primary Examiner — Nahida Sultana
(74) Attorney, Agent, or Firm — FOLEY & LARDNER LLP

(57) ABSTRACT

The present disclosure describes three-dimensional (3D) printing apparatuses, processes, software, and systems for producing high quality 3D objects. Described herein are printing apparatuses that facilitate control of energy beam characteristics using an optical mask during one or more printing operations.

18 Claims, 17 Drawing Sheets

Related U.S. Application Data of application No. 18/093,358, filed on Jan. 5, 2023, now abandoned, which is a continuation of application No. 17/950,222, filed on Sep. 22, 2022, now abandoned, which is a continuation of application No. 17/839,659, filed on Jun. 14, 2022, now abandoned, which is a continuation of application No. 17/690,771, filed on Mar. 9, 2022, now abandoned, which is a continuation of application No. 17/534,686, filed on Nov. 24, 2021, now abandoned, which is a continuation of application No. 17/399,672, filed on Aug. 11, 2021, now abandoned, which is a continuation of application No. 17/246,850, filed on May 3, 2021, now abandoned, which is a continuation of application No. 17/151,937, filed on Jan. 19, 2021, now abandoned, which is a continuation of application No. 16/404,579, filed on May 6, 2019, now abandoned, which is a continuation of application No. 16/248,665, filed on Jan. 15, 2019, now abandoned, which is a continuation of application No. 16/137,295, filed on Sep. 20, 2018, now abandoned, which is a continuation of application No. 15/871,763, filed on Jan. 15, 2018, now Pat. No. 10,144,176.

(51) Int. Cl.
| | |
|---|---|
| *B22F 10/322* | (2021.01) |
| *B22F 10/36* | (2021.01) |
| *B22F 12/30* | (2021.01) |
| *B22F 12/63* | (2021.01) |
| *B22F 12/67* | (2021.01) |
| *B29C 64/153* | (2017.01) |
| *B29C 64/232* | (2017.01) |
| *B29C 64/245* | (2017.01) |
| *B29C 64/25* | (2017.01) |
| *B29C 64/255* | (2017.01) |
| *B29C 64/268* | (2017.01) |
| *B29C 64/371* | (2017.01) |
| *B33Y 30/00* | (2015.01) |
| *B33Y 70/00* | (2020.01) |
| *B22F 10/32* | (2021.01) |
| *B22F 10/366* | (2021.01) |
| *B22F 10/64* | (2021.01) |
| *B22F 10/66* | (2021.01) |
| *B22F 10/77* | (2021.01) |
| *B22F 12/41* | (2021.01) |
| *B22F 12/45* | (2021.01) |
| *B22F 12/90* | (2021.01) |
| *B29C 64/214* | (2017.01) |

(52) U.S. Cl.
CPC ............ *B22F 12/90* (2021.01); *B22F 2999/00* (2013.01); *B29C 64/214* (2017.08)

(56) References Cited

U.S. PATENT DOCUMENTS

| | | | |
|---|---|---|---|
| 2016/0207113 A1* | 7/2016 | Nagai | B22F 9/14 |
| 2017/0341183 A1* | 11/2017 | Buller | B22F 10/66 |
| 2018/0186082 A1* | 7/2018 | Randhawa | B33Y 50/02 |
| 2019/0217416 A1* | 7/2019 | Brochu | G06F 30/23 |
| 2020/0315570 A1* | 10/2020 | Ambrozinski | A61B 5/0051 |
| 2023/0036660 A1* | 2/2023 | Dorini | B29C 64/364 |

* cited by examiner

THREE-DIMENSIONAL PRINTING SYSTEMS AND METHODS OF THEIR USE

CROSS-REFERENCE

This application is a continuation of U.S. patent application Ser. No. 18/141,527 filed May 1, 2023, which is a continuation of U.S. patent application Ser. No. 18/093,358 filed Jan. 5, 2023, which is a continuation of U.S. patent application Ser. No. 17/950,222 filed Sep. 22, 2022, which is a continuation of U.S. patent application Ser. No. 17/839,659 filed Jun. 14, 2022, which is a continuation of U.S. patent application Ser. No. 17/690,771 filed Mar. 9, 2022, which is a continuation of U.S. patent application Ser. No. 17/534,686 filed Nov. 24, 2021, which is a continuation of U.S. patent application Ser. No. 17/399,672 filed Aug. 11, 2021, which is a continuation of U.S. patent application Ser. No. 17/246,850 filed May 3, 2021, which is a continuation of U.S. patent application Ser. No. 17/151,937 filed Jan. 19, 2021, which is a continuation of U.S. patent application Ser. No. 16/404,579 filed May 6, 2019, which is a continuation application of U.S. patent application Ser. No. 16/248,665 filed Jan. 15, 2019, which is a continuation application of U.S. patent application Ser. No. 16/137,295 filed Sep. 20, 2018, which is a continuation of U.S. patent application Ser. No. 15/871,763 filed Jan. 15, 2018, now U.S. Pat. No. 10,144,176 issued Dec. 4, 2018; each of which is entirely incorporated herein by reference.

BACKGROUND

Three-dimensional (3D) printing is a process for making objects by sequential deposition of material, at times under computer control. For example, the objects can be made sequentially by forming multiple layers of material that are joined together to form a 3D object having desired dimensions. A variety of materials can be used, including metal, ceramic, or polymeric materials. 3D printing systems can vary in the method by which a starting material is transformed to print the 3D object. The transformation methods can include melting, sintering, softening, hardening, or liquifying a starting material to form the 3D object. The quality of a 3D object can depend on the processing methodology and conditions for printing the 3D object. For example, the type of material, the temperatures used to perform the transformation, as well as atmospheric conditions surrounding the 3D object during its formation, may influence characteristics of the 3D object. These characteristics may include the shape, roughness, and porosity, of the 3D object. Currently needed are improved 3D printing systems and methods for controlling the characteristics of 3D objects to obtain the requested 3D object.

SUMMARY

In one aspect, systems, apparatuses, methods, controllers, and/or non-transitory computer-readable media (e.g., software) for printing three-dimensional objects is described.

In another aspect, an apparatus for printing a three-dimensional object comprises: a platform configured to support a powder bed comprising a powder material; a layer forming device configured to form multiple layers of the powder as part of the powder bed, which layer forming device comprises a blade or a roller configured to translate in a first direction over an exposed surface of the powder bed to planarize the exposed surface of the powder bed; an elevator operationally coupled with the platform, wherein the elevator comprises a motor configured to translate the platform in a second direction substantially perpendicular to the first direction; a processing chamber having an internal volume configured to enclose at least the exposed surface of the powder bed during the printing, wherein the processing chamber includes a ceiling wall; a laser configured to generate a laser beam that melts at least a portion of the powder bed to a molten material as part of the three-dimensional object during the printing; a window coupled to the ceiling wall of the processing chamber, which window is configured to permit the laser beam to pass therethrough to the internal volume of the processing chamber; a gas flow system configured to provide a flow of gas within the internal volume of the processing chamber, which flow of gas provides a stream of particles that progressively deposits an optical mask on an internal surface of the window, which optical mask progressively absorbs energy from the laser beam and modifies a peak power density of the laser beam during melting of at least one of the multiple layers of powder, wherein the optical mask causes the peak power density of the laser beam to vary by (i) at least 5% after forming 3,000 $cm^3$ of the molten material compared to a variation of the peak power density of the laser beam transmitted through the window excluding the optical mask and (ii) at least 10% after forming 5,000 $cm^3$ of the molten material compared to the variation of the peak power density of the laser beam transmitted through the window excluding the optical mask; a galvanometer scanner configured to translate the laser beam across the exposed surface of the powder bed in accordance with a path, wherein the galvanometer scanner is external to the internal volume of the processing chamber; and one or more controllers operationally coupled with the elevator, the layer forming device and the galvanometer scanner, which one or more controllers is configured to direct (a) the elevator to translate the platform in the second direction, (b) the layer forming device to translate in the first direction, and (c) the galvanometer scanner to direct the laser beam at the powder bed in accordance with the path.

In some embodiments, the optical mask causes the peak power density of the laser beam to increase during at least part of the melting of the at least one of the multiple layers of powder. In some embodiments, the optical mask causes the peak power density of the laser beam to decrease during at least part of the melting of the at least one of the multiple layers of powder. In some embodiments, during the printing, the apparatus is configured to melt at least about five (5) cubic centimeters of the molten material per hour. In some embodiments, the varied peak power density of the laser beam in accordance with one or both of (i) and (ii) is associated with forming regions of porosity within the three-dimensional object. In some embodiments, the regions of porosity are gradations of porosity across at least part of the multiple layers of the three-dimensional object. In some embodiments, the varied peak power density of the laser beam in accordance with one or both of (i) and (ii) is associated with forming regions of surface roughness on the three-dimensional object. In some embodiments, the peak power density is measured at the exposed surface of the powder bed. In some embodiments, the stream of particles includes particles that become entrained within the flow of gas at or above the exposed surface of the powder bed. In some embodiments, the particles comprise powder, soot, or spatter. In some embodiments, the one or more controllers is operationally coupled with the gas flow system, which one or more controllers is configured to control a velocity of the stream of particles. In some embodiments, the control is in real time during the printing of the three-dimensional object. In some embodiments, the apparatus is configured generate at least about five (5) milligrams per second (mg/sec) of gas-borne particles (e.g., from the powder bed) during the printing. In some embodiments, the gas flow system is configured to facilitate a turbulent movement of the stream of particles in the internal volume of the processing chamber. In some embodiments, (I) a (e.g., side) wall of the processing chamber and/or (II) a baffle in the processing chamber, is configured to facilitate the turbulent movement of the stream of particles. In some embodiments, (Ill) the wall of the processing chamber and/or (IV) the baffle in the processing chamber, is (e.g., substantially) normal to the internal surface of the window. In some embodiments, the turbulent movement is directly adjacent to the window. In some embodiments, the turbulent movement of the stream of particles comprises a cyclic movement, a backflow, a vortex, or a chaotic movement of the stream of particles. In some embodiments, the window is in a recessed portion of the processing chamber, wherein a side wall of the recessed portion causes the turbulent movement of the stream of particles to preferentially deposit particles on a select region of the internal surface of the window. In some embodiments, the select region is at an edge or a center of the window. In some embodiments, the select region is between an edge and a center of the window. In some embodiments, the wall of the recessed portion is (e.g., substantially) normal to the internal surface of the window. In some embodiments, the window is in a recessed portion of the processing chamber, wherein walls of the recessed portion causes the turbulent movement of the stream of particles to deposit particles substantially evenly across the internal surface of the window. In some embodiments, the gas flow system is configured to provide the flow of gas at a substantially constant velocity within the processing chamber during at least the melting of the at least the portion of the powder bed. In some embodiments, the flow of gas comprises an inert gas. In some embodiments, the flow of gas has a velocity ranging from about 0.2 to about 2 meters per second (m/sec). In some embodiments, particles within the stream of particles have average fundamental length scale (e.g., diameter) ranging from about 0.1 and about 1 micrometer (μm). In some embodiments, particles within the stream of particles comprise at least about 10% metal oxide by volume. In some embodiments, the flow of gas has a peak horizontal velocity at a distance of about 15 to about 100 millimeters (mm) above the exposed surface of the powder bed In some embodiments, the flow of gas comprises a primary flow of gas and a recirculating flow of gas derived from the primary flow of gas, wherein the stream of particles is within the recirculating flow of gas In some embodiments, the gas flow system comprises one or more inlet openings and one or more outlet openings, wherein a primary portion of the flow of gas flows directly from the one or more inlet openings to the one or more outlet openings. In some embodiments, the one or more inlet openings or the one or more outlet openings correspond to openings of a perforated plate, a screen, a mesh or a gas permeable material. In some embodiments, the one or more inlet openings or the one or more outlet openings are operatively couple to, or comprise: a perforated plate, a screen, a mesh, or a gas permeable material. The gas permeable material can be a block or slab of material. The gas permeable material may be a material comprising (e.g., random) passages, voids (e.g., bubbles), and/or holes. The gas permeable material may comprise elemental metal, metal alloy, ceramic, an allotrope of elemental metal, a polymer, or a resin. The gas permeable material can be organic or inorganic. The gas permeable material may comprise a cloth. The gas permeable material may comprise a thread. In some embodiments, the primary portion of the flow of gas is in a (e.g., substantially) vertical direction. In some embodiments, the primary portion of the flow of gas in a (e.g., substantially) horizontal direction. In some embodiments, the one or more inlet openings are within an inlet region coupled to the ceiling wall of the processing chamber, and the one or more outlet openings are within a side wall or a floor of the processing chamber. In some embodiments, the one or more inlet openings are within a first side wall of the processing chamber, and the one or more outlet openings are within a second side wall or a floor of the processing chamber. In some embodiments, the laser is configured to generate the laser beam having an average power density ranging from about 100 to about 30,000 per centimeter squared ($kW/cm^2$), which power density is measured at the exposed surface of the powder bed. In some embodiments, a power of the laser is configured to be modified during the printing. In some embodiments, the system further comprises an optical system configured to modify at least one characteristic of the laser beam, wherein the optical system is configured to focus or defocus the laser beam at the exposed surface of the powder bed. In some embodiments, the system further comprises a build module removably coupled to the processing chamber during the printing, wherein the processing chamber and the build module are configured to decouple from each other after the printing of the three-dimensional object. In some embodiments, decoupling processing chamber and the build module causes an external atmosphere to enter the internal volume of the processing chamber. In some embodiments, the stream of particles is disrupted before decoupling the processing chamber and the build module. In some embodiments, decoupling the processing chamber and the build module disrupts the stream of particles. In some embodiments, during the printing, the laser is configured to melt from about 1 to about 50 cubic centimeters per hour ($cm^3/hr$) of the molten material. In some embodiments, during the printing is at least during the melting of the at least the portion of the powder bed to the molten material. In some embodiments, the apparatus comprises multiple lasers, multiple windows and/or multiple galvanometer scanners. In some embodiments, the window is at least about 85% transparent to the laser beam. In some embodiments, the window comprises silica or quartz. In some embodiments, the varied peak power density of the laser beam in accordance with one or both of (i) and (ii) is associated with forming a pattern of porosity and/or surface roughness within and/or on the three-dimensional object. In some embodiments, the pattern of porosity or surface roughness comprises (a) a gradual increase or decrease in porosity, or (b) a gradual increase or decrease in surface roughness, as measured across an area or length of the three-dimensional object. In some embodiments, the pattern of porosity comprises repetitive gradations in porosity and/or surface roughness in and/or on the three-dimensional object. In some embodiments, the controller is configured to facilitate cleaning of the window. In some embodiments, the cleaning is during the printing of the three-dimensional object. In some embodiments, the controller is configured to facilitate formation of a pattern of porosity and/or surface roughness, in and/or on the three-dimensional object. In some embodiments, the varied peak power density of the laser beam in accordance with one or both of (i) and (ii) is associated with forming a first region of the three-dimensional object having a first porosity of greater than about 1% and a second region of the three-dimensional object having a second porosity of about 1% or less. In some embodiments, the varied peak power density of the laser beam in accordance with one or both of (i) and (ii) is associated with forming a first region of the three-dimensional object having a first surface roughness of greater than about 50 micrometers and a second region of the three-dimensional object having a second surface roughness of about 50 micrometers or less. In some embodiments, the laser is configured generate the laser beam having a laser power density ranging from about 100 to about 30,000 Kilo Watts per centimeter squared (kW/cm2) at the exposed surface of the powder bed. In some embodiments, the gas flow system is configured to form the optical mask within the internal volume of the processing chamber. In some embodiments, a distance between the internal surface of the window and the exposed surface of the powder bed ranges from about 10 and about 100 centimeters (cm). In some embodiments, the one or more controllers operationally coupled with the gas flow system, which one or more controllers are configured to direct the gas flow system to provide the flow of gas within the processing chamber. In some embodiments, the one or more controllers operationally coupled with the gas flow system, which one or more controllers are configured to adjust the gas flow. In some embodiments, the one or more controllers operationally coupled with the gas flow system, which one or more controllers are configured to adjust the rate and/or location of particle deposition on at least a portion of the window.

Another aspect of the present disclosure provides a method for using the apparatuses disclosed herein (e.g., according to its intended function).

In another aspect, an apparatus for printing one or more 3D objects comprises a controller that is programmed to direct a mechanism used in a 3D printing methodology to implement (e.g., effectuate) any of the method and/or functions of the apparatuses disclosed herein, wherein the controller is operatively coupled to the mechanism.

In another aspect, a computer software product, comprising a non-transitory computer-readable medium in which program instructions are stored, which instructions, when read by a computer, cause the computer to direct a mechanism used in the 3D printing process to implement (e.g., effectuate) any of the method and/or functions of the apparatuses disclosed herein, wherein the non-transitory computer-readable medium is operatively coupled to the mechanism.

Another aspect of the present disclosure provides a non-transitory computer-readable medium comprising machine-executable code that, upon execution by one or more computer processors, implements any of the methods and/or functions of the apparatuses disclosed herein.

Another aspect of the present disclosure provides a computer system comprising one or more computer processors and a non-transitory computer-readable medium coupled thereto. The non-transitory computer-readable medium comprises machine-executable code that, upon execution by the one or more computer processors, implements any of the methods and/or functions of the apparatuses disclosed herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "Fig." and "Figs." herein), of which:

Figure 1:
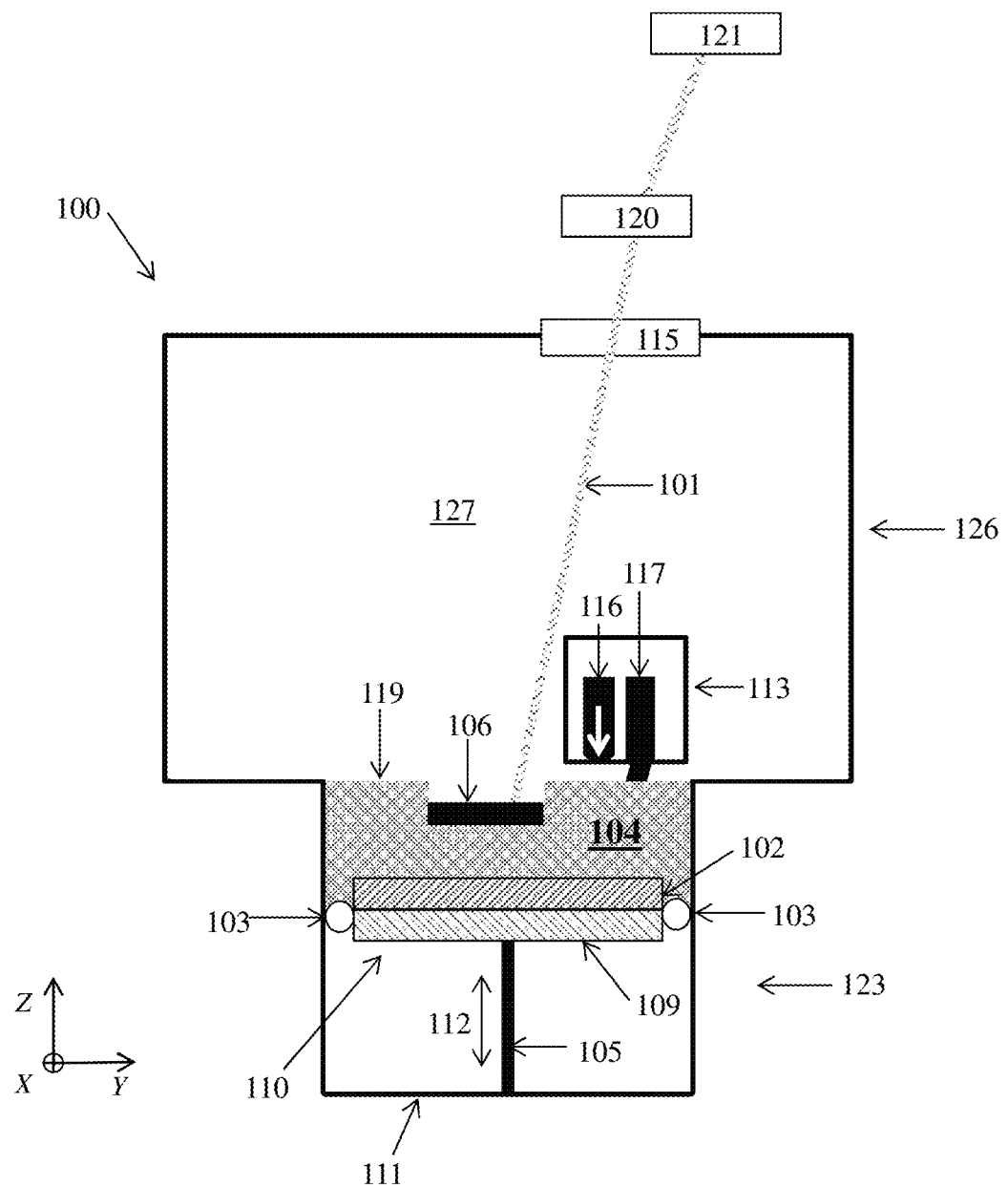
FIG. 1 schematically illustrates a section view of a portion of a three-dimensional (3D) printer.

The figures and components therein may not be drawn to scale. Various components of the figures described herein may not be drawn to scale.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

The present disclosure provides apparatuses, systems and methods for controlling aspects of printing 3D objects. In some embodiments, the apparatuses, systems and methods are used to form features, such as porous or rough regions, within and/or on the 3D objects. In some cases, the 3D object includes gradations of porous or rough regions, where the porosity or roughness gradually transitions from a less porous or rough region to a more porous or rough region within the 3D object. In some embodiments, the energy (e.g., laser) beam power is varied such that certain portions of a powder bed (used to form the 3D object) experience higher power density than other portions of the powder bed.

In some embodiments, an optical mask is used to absorb some of the energy of the laser beam, thereby modifying the characteristics of the laser beam before it impinges upon the powder bed. In some embodiments, the optical mask progressively changes during a printing process to allow for (e.g., gradual) changes in laser beam peak power density. The optical mask may be formed on an optical element, such as a window, of the 3D printer. In some embodiments, the optical mask is formed by (e.g., gradual) accumulation of debris on the optical element, e.g., particles transited to the window by a stream of gas.

The term "operatively coupled" or "operatively connected" refers to a first mechanism that is coupled (or connected) to a second mechanism to allow the intended operation of the second and/or first mechanism. The term "configured to" refers to an object or apparatus that is (e.g., structurally) configured to bring about a result.

Terms such as "a," "an" and "the" are not intended to refer to only a singular entity, but include the general class of which a specific example may be used for illustration. The terminology herein is used to describe specific embodiments, but their usage does not limit the specified embodiments.

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes "next to," "adjoining," "in contact with," and "in proximity to."

Fundamental length scale (abbreviated herein as "FLS") can refer herein as to any suitable scale (e.g., dimension) of an object. For example, a FLS of an object may comprise a length, a width, a height, a diameter, a spherical equivalent diameter, or a diameter of a bounding sphere. In some cases, FLS may refer to an area, a volume, a shape, or a density.

The present disclosure provides three-dimensional (3D) printing apparatuses, systems, software, and methods for forming 3D objects. A powder, as understood herein, is a granular material before it has been melted using a printing operation (also referred to as "printing"). During melting can refer to the time frame in which a laser beam is impinging on the powder material and transforming (e.g., melting) the powder material to a molten state. The melting can be complete or partial melting. During printing can refer to the time frame in which one or more 3D objects are being formed. Reference is made herein as to a "build," which can refer to the one or more 3D objects being printed above (e.g., on) a build platform. During a build can refer to the time frame for printing one or more 3D objects above (e.g., on) a build platform. In some cases, the printing apparatus is continuously in operation (e.g., printing a portion of the one or more 3D objects and/or forming a layer of powder) during a build. In some cases, one or more operations of the printing apparatus is/are paused (e.g., interrupted) during a build. The printer may be referred herein as a "printing system" and a "printing apparatus."

In some embodiments, the size of the particles of the powder range from about 10 micrometers (μm) to about 50 μm in fundamental length scale (e.g., diameter). The printing can include sequentially melting multiple sequentially deposited layers of powder respectively, where one layer of melted (molten) material fuses with an adjacent layer to form at least a portion of a 3D object. Some of the printing techniques described herein are in accordance with selective laser melting (SLM), selective heat sintering (SHS), or selective laser sintering (SLS) techniques. The powder can be made of any suitable material. For example, the powder may comprise an elemental metal or metal alloy. In some embodiments, the material comprises a metal, such as steel (e.g., stainless steel), aluminum, aluminum alloys, nickel, nickel alloys (e.g., Inconel), titanium and/or titanium alloys.

The printing system may include an enclosure. FIG. 1 shows a cross-section side view of an example printer having an enclosure 100, which includes a processing chamber 126 and a build module 123 that is configured to accommodate the powder bed 104. The processing chamber has walls that define an internal volume 127. The internal volume of the processing chamber can accommodate a laser beam 101 generated by a laser 121. In some cases, the laser beam is directed through a window 115 that is coupled to a wall of the processing chamber. The window may be referred herein as an "optical window." In some embodiments, the window is coupled to a ceiling (e.g., top wall) of the processing chamber. The window 115 can be made of any suitable material. In some embodiments, the window is made of a material that is at least about 85%, 90%, 95% or 99% transparent to certain wavelengths of the laser beam. In some cases, the window is comprised of a silica (e.g., fused silica) or quartz (e.g., fused quartz). The laser beam is directed at an exposed surface 119 of the powder bed to melt at least a portion of the powder. The impinged-on portion of the powder bed that has been melted, subsequently cools to a hardened material 106 as part of the 3D object. The 3D object may be anchored to the platform (e.g., comprising a base such as 102), or be suspended anchorlessly in the powder bed (e.g., 104). Any of the enclosure structure parts and/or platform may comprise elemental metal, metal alloy, or ceramic (e.g., as described herein).

The internal volume of the processing chamber is configured to enclose at least the exposed surface (e.g., 119) of the powder bed (e.g., 104) and maintain an atmosphere while the melting process occurs. For example, the walls of the processing chamber can at least partially isolate the internal atmosphere from an external environment (e.g., ambient environment). In some cases, the external environment is the environment of a room in which the printer is located. In some cases, the processing chamber is further enclosed within another environment different than the external environment. For example, the processing chamber, build module and/or additional chambers (e.g., unpacking station) may be enclosed within a larger enclosure that has its own internal environment. In some embodiments, the atmosphere in the processing chamber includes one or more inert gases, such as argon and/or nitrogen. In some cases, the walls of the processing chamber may function to protect users of the printer from contents of the atmosphere, laser beam, debris, and/or the powder, from users of the printer. For example, the walls may provide protection against the laser beam and/or any combustible material.

The laser can be any suitable type of laser, such as a fiber laser, a solid-state laser, or a diode laser. In some embodiments, the laser is configured to generate an optical power output (laser power) ranging from about 100 Watts to about 1,000 Watts. In some embodiments, the laser power is modified (e.g., increased and/or decreased) during a printing operation. The laser power modification can be controlled manually and/or automatically (e.g., using a controller). In some embodiments, the laser may be configured to generate a laser beam having a power density on the powder bed ranging from about 100 kilowatts per centimeter squared ($kW/cm^2$) to about 30,000 $kW/cm^2$. In some embodiments, the laser is configured to generate a laser beam having peak wavelength in a range of about 800 nm to about 1,500 nm.

In some embodiments, the laser is configured to generate a laser beam having a spot size on the powder bed having a diameter ranging from about 50 micrometers (μm) to about 500μm.

Characteristics and/or movement of the laser beam can be modified by one or more optical elements (e.g., 120), which may be situated inside or outside of the enclosure and/or processing chamber. In some embodiments, the optical elements and/or the laser are enclosed within a separate chamber (e.g., external) (e.g., adjacent) to the processing chamber and/or part of the enclosure of the printer). The optical elements can include one or more scanners (e.g., galvanometer scanners), polygons, mechanical stages (e.g., X-Y stages), piezoelectric devices, gimbles, mirror, lenses, windows, beam splitters, and/or prisms. The scanners can be configured to direct (e.g., by deflection) the laser beam across the surface of the powder bed in accordance with a (e.g., predetermined) path. In some embodiments, the scanners are configured to provide scan speeds up to about 5 meters per second (m/s). The laser path can include one or more hatches. The laser path can be in accordance with a stripe pattern, island pattern and/or chessboard pattern. The laser beam scanning may be unidirectional, bidirectional, spiral and/or double scan. The window (e.g., 115) can be considered an optical element in that it allows transmission of laser beam (e.g., 101) into the internal volume (e.g., 127) of the processing chamber.

The enclosure may include one or more build modules (e.g., 123). A build module can be removably coupled with the processing chamber or be integrally coupled to the processing chamber. The build module can include an internal volume configured to enclose at least a portion of a platform (e.g., 110) (also referred to herein as a "build platform"), which is configured to support the powder bed. In some cases, the platform includes a base (e.g., 102) and/or a substrate (e.g., 109). In some embodiments, the surface of the platform that supports the powder bed has an area ranging from about 100 square centimeters (cm²) to about 10,000 cm². The internal volume of the build module can be configured to enclose at least a portion of an elevator (e.g., 105) that is configured to move (e.g., vertically translate) the platform. In some embodiments, the platform is configured to translate in vertical steps ranging from about 20 micrometers (μm) to about 500 μm. In some embodiments, the platform is configured to support a powder bed having a height (e.g., in Z direction of FIG. 1) ranging from about 100 millimeters (mm) to about 1,000 mm. In some embodiments, one or more seals (e.g., 103) enclose the powder in a selected area within the build chamber (e.g., away from the elevator). The elevator may comprise an actuator (e.g., a motor).

The build module may be removably engageable with the processing chamber (e.g., configured to engage and disengage). For example, the build module may be engaged with the processing chamber during a printing operation to at least partial isolate the internal volume of processing chamber from the external atmosphere. After a printing operation, the build module can be disengaged from the processing chamber. In some cases, the disengagement opens the internal volume of the processing chamber and/or the build module to the external atmosphere. In some embodiments, the build module and/or the processing chamber (each) includes a shutter that isolates the atmosphere within the build module and/or the processing chamber upon disengagement.

Figure 2:
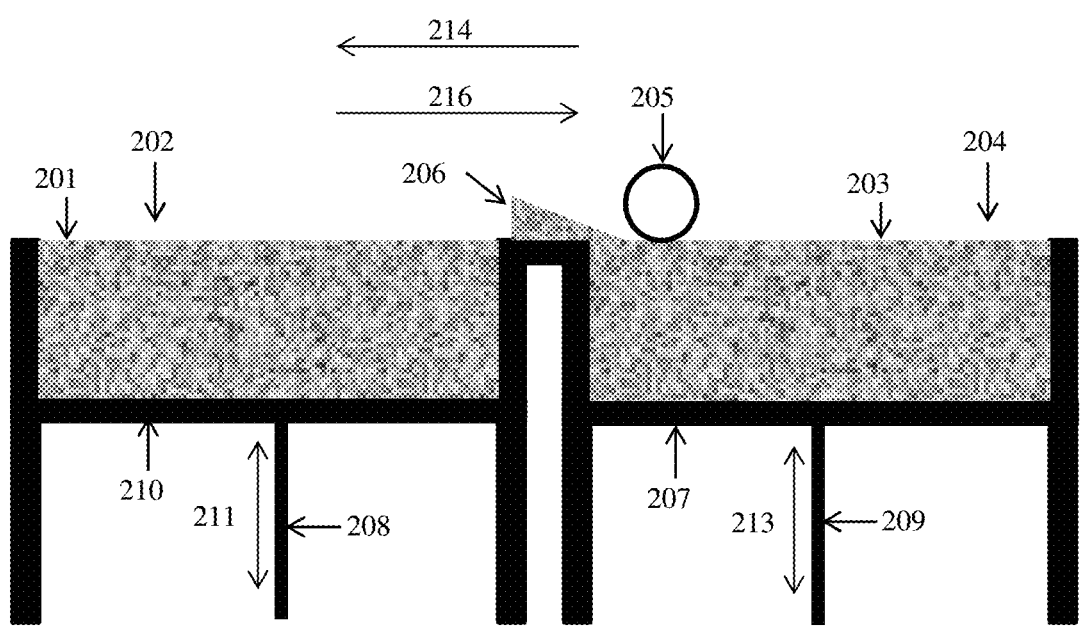
FIG. 2 schematically illustrates a section view of a portion of a 3D printer.

The 3D printer may include a layer forming devices (e.g., 113) (also referred to herein as a "layer dispenser"). The layer forming device may include a powder dispenser (e.g., 116) and/or a leveler (e.g., 117). The leveler (also referred to herein as "planarizer") can include at least one blade or roller that contacts the powder bed to provide a leveled (e.g., planar) exposed surface for the powder bed. In some embodiments, the 3D printer includes a container for holding a supply of powder (e.g., a reservoir). FIG. 2 shows a side view of an example container 204 adjacent build module 202, which includes platform 210. The platform can be (e.g., vertically) translatable 211 by an elevator 208 (comprising an actuator). In some cases, the layer forming device translates and pushes a portion (e.g., 206) of the powder from the container to the region above the platform. The translation can be in a first direction (e.g., 214) toward a region above the platform, and in a second direction (e.g., 216) toward the container (e.g., to prepare for forming a subsequent layer). In some embodiments, a second elevator (e.g., 209) of the container is translatable (e.g., 213) so as to translate the supply of powder (e.g., upward). The translating of the layer dispenser can be in directions (e.g., substantially) perpendicular to a translation direction (e.g., 211) of the platform and/or a translation direction (e.g., 213) of the support member (e.g., 207) of the container. In some embodiments, the layer dispenser is configured to provide a layer of powder having a thickness ranging from about 20 micrometers (μm) to about 500 μm.

Figure 8:
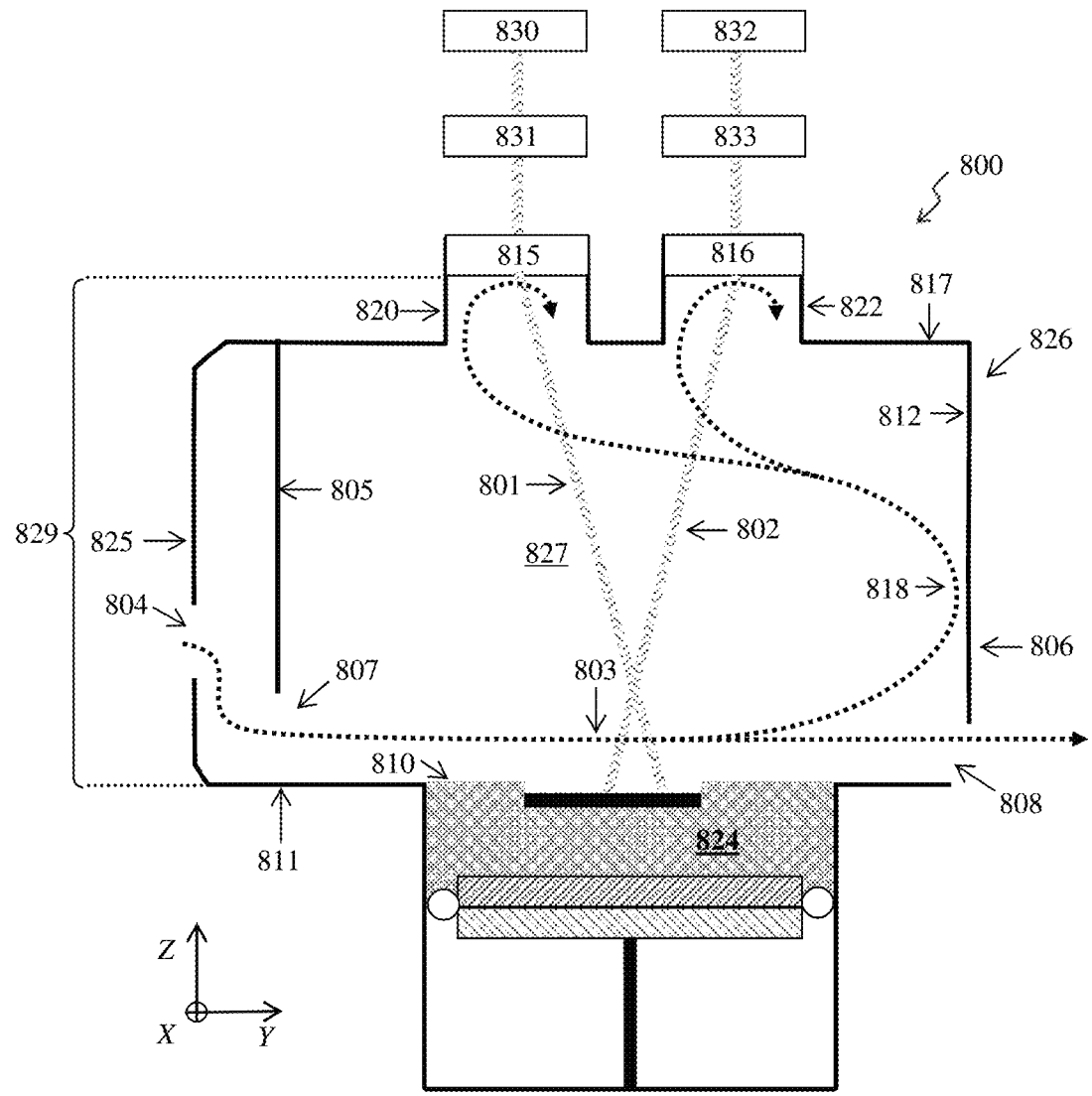
FIG. 8 schematically illustrates a section view of a portion of a 3D printer.

In some cases, the printer includes more than one laser. For example, the printer can have two, three, four, five, or more lasers. FIG. 8 shows a section view of a portion of an example printer having two lasers 830 and 832, optical elements 831 and 833 and windows 815 and 816 for directing laser beams 801 and 802 respectively toward the powder bed 824. At one time, at least two of the lasers can be used simultaneously or sequentially (e.g., one at a time). In some applications, multiple laser beams (e.g., 2, 3, 4, or 5) are used in parallel. In some cases, at least two laser beams are scanned at different rates, and/or along different paths. For example, the movement of a first laser beam may be faster than the movement of a second laser beam. In some cases, at least two laser beams are scanned at (e.g., substantially) the same rates, and/or along (e.g., substantially) the same paths.

The printing systems described herein are configured to change a characteristic of the laser beam(s). In some embodiments, the laser beam characteristic is changed during a printing operation (e.g., in situ and in real-time). In some embodiments, the power of the laser can be modified to change the power density of the laser beam at the exposed surface of the powder bed. In some embodiments, the one or more optical elements are used to modify the laser beam spot size and/or focus at the exposed surface of the powder bed. A different laser beam energy may cause the powder to melt in different ways. For example, a first laser beam characteristic(s) can cause the powder to melt in a way that results in pores forming in the 3D object, while a second laser beam characteristic(s) can cause the powder to melt without forming pores in the 3D object. As another example, a first laser beam characteristic(s) can cause the powder to melt in a way that results in a rough surface on the 3D object, while a second laser beam characteristic(s) can cause the powder to melt in a way that results in a smooth surface on the 3D object. A smooth surface may be a low roughness surface, e.g., having a low Ra value. Low roughness may be relative to a rough surface that has a high roughness, e.g., having a high Ra value. The laser beam characteristic(s) can be a set of laser beam characteristics. Changing the laser beam characteristic(s) during the printing process can cause different portions of the 3D object to have regions of differing porosity and/or surface roughness. For example, a first object (or a first portion of an object) can have a porosity less than about 1%, 2%, 3%, 4% or 5% by volume, and a second object (or a second portion of the object) can have a porosity greater than about 1%, 2%, 3%, 4% or 5% by volume. For example, a first object (or a first portion of an object) can have a surface roughness (Ra) less than about 50 micrometers (μm), 60 μm, 70 μm, 80 μm, 90 μm, 100 μm or 150 μm, and a second object (or a second portion of the object) can have an Ra greater than about 50 μm, 60 μm, 70 μm, 80 μm, 90 μm, 100 μm or 150 μm. The laser beam characteristic may comprise power density, speed, trajectory, Andrew number, footprint on the exposed surface, cross-section, pulse frequency, dwell time, intermission time, or focus.

Figure 3A:
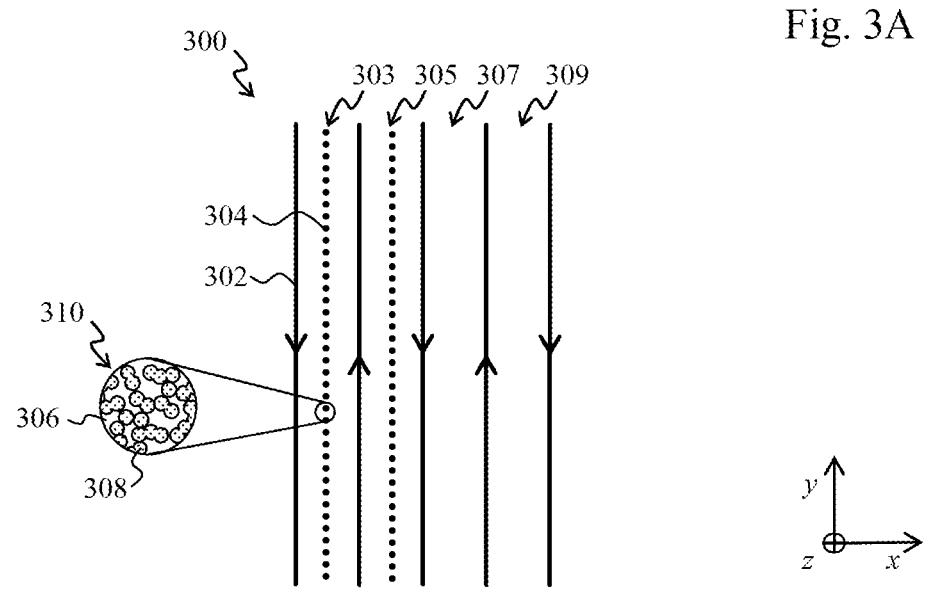
FIGS. 3A and 3B schematically illustrate various views of 3D objects.
Figure 16:
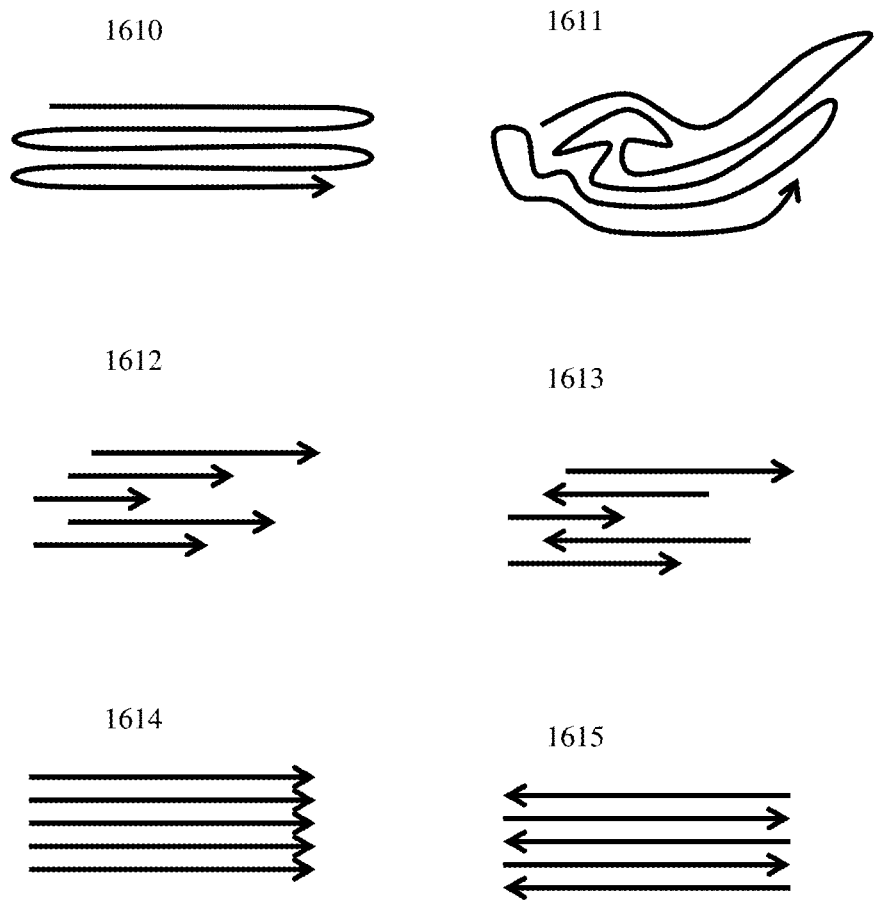
FIG. 16 schematically illustrates various paths.

In some cases, a pattern of pores is formed in accordance with a path of the laser beam. FIG. 3A illustrates a top view of a portion of an object 300 having a pattern of pores 304. During a printing operation, the center of the laser beam can be scanned across a layer of the powder bed along a path 302. The path can be in straight lines, curved lines, and/or winding (e.g., serpentine) lines, and can be continuous or discontinuous. FIG. 16 shows top-down view examples of various paths along which a laser beam may travel. The path may have any suitable shape (e.g., paths 1610-1615), and can be continuous (e.g., 1610, or 1611) or discontinuous (e.g., 1612, 1613, 1614, or 1615). The paths may be parallel or non-parallel with respect to each other. The laser beam can move along the path in opposite directions (e.g., shown by arrows in FIG. 3A) or in the same direction. The intervening regions (e.g., 303, 305, 307 and 309) between the paths (e.g., 302) may experience more or less energy provided by the laser beam, depending on one or more of the laser beam characteristics. When the energy is sufficiently high to cause the powder to melt (e.g., at or above the melting point), and sufficiently low to prevent the molten powder from evaporating, the powder particles may fuse together with substantially no pores (as shown in intervening regions examples of 307 and 309). When the energy is sufficiently low to cause the powder to only partially melt, the powder particles may partially fuse together and form pores (as shown in intervening regions examples of 303 and 305). The pores may also manifest if the energy of the laser is sufficiently high to cause part of the molten material to evaporate. In the example shown in FIG. 3, inset 310 shows powder particles 308 that are partially fused together to form pores 306.

Figure 3B:
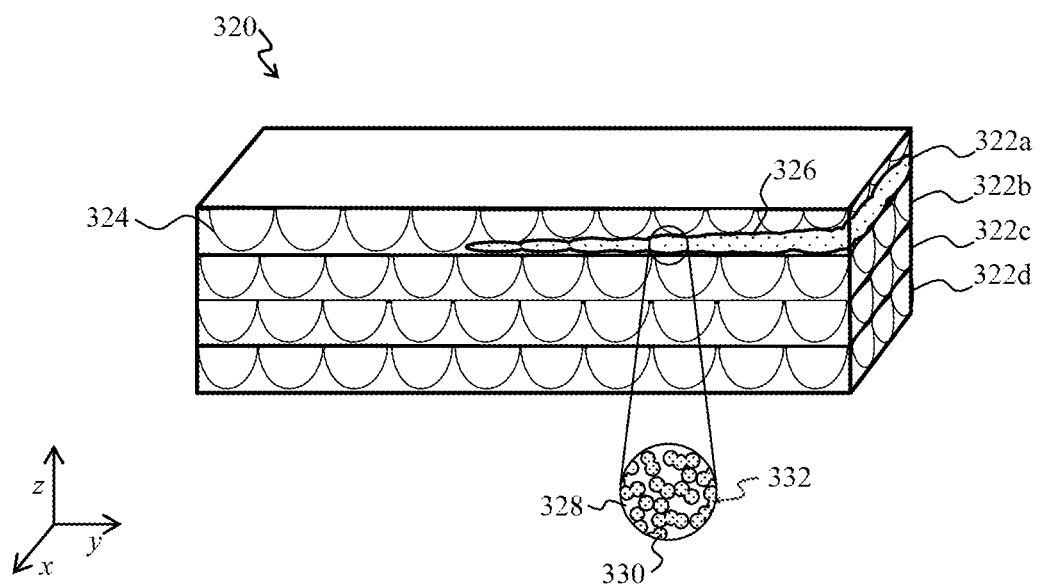

In some cases, pores may be associated with partially melting through a thickness of a layer of powder. FIG. 3B illustrates a perspective section view of a portion of an object 320, having multiple layers 322a, 322b, 322c and 322d. During printing, the laser beam can melt a layer of powder to a corresponding layer of molten material, which hardens to hardened material. The printing process can involve forming melt pools (e.g., 324) in each layer. The melt pools may have (e.g., substantially) hemispherical shapes. In some cases, the laser beam transmits insufficient energy to melt the powder through the entire thickness of a layer of powder. This can cause regions (e.g., 326) of one or more of the layers to be only partially melted, thereby making these regions more porous. Inset 332 shows powder particles 330 that are partially fused together so as to form pores 328. In some cases, the thickness-related porous regions have a planar shape (e.g., in accordance with a layer).

Figure 4:
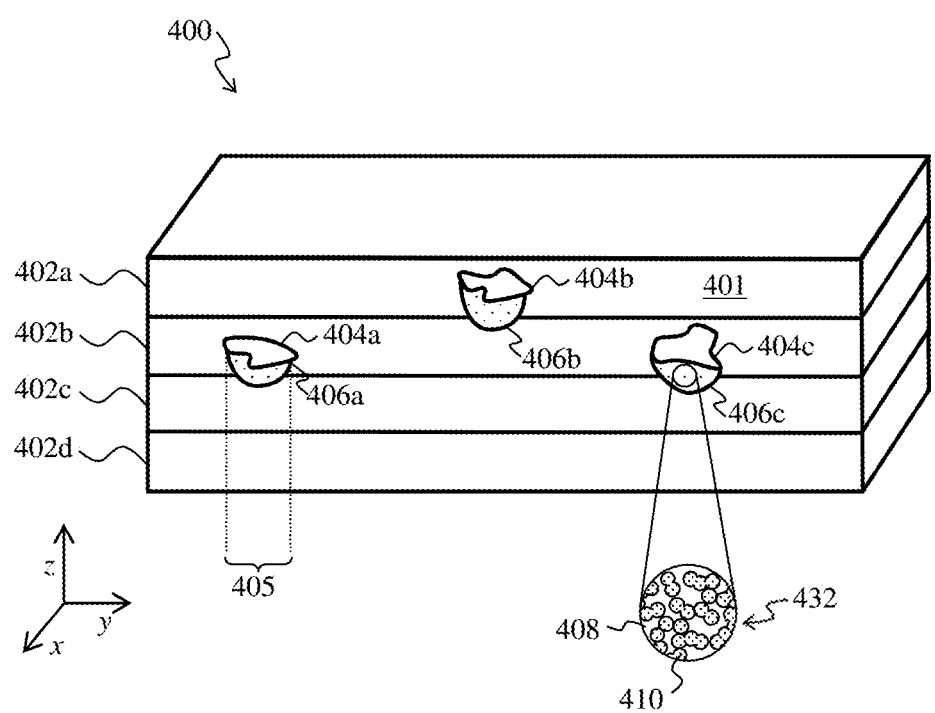
FIG. 4 schematically illustrates a 3D object.

In some cases, the pores are associated with spatter that may form during the printing process. FIG. 4 illustrates a perspective section view a portion of object 400 having spatter 404a, 404b and 404c. The spatter may correspond to droplets of molten or partially molten material ejected from the surface of powder bed due to the impingement (e.g., irradiation) of the laser beam. The ejected spatter can fall on the powder bed and/or the object, and may be incorporated in the object. The spatter may be situated within a single layer (e.g., 402a, 402b, 402c or 402d) or span multiple layers of the object. Spatter may or may not be detectable within the object. For example, the spatter may re-melt during the printing process such that the spatter has (e.g., substantially) the same composition (e.g., microstructure) as surrounding portions 401 of the object. In some cases, the spatter has a different microstructure than surrounding portions 401 of the object. During formation of subsequent layers, the spatter may at least partially occlude regions of powder, (e.g., below the splatter) from the laser beam. This can cause regions 406a, 406b and 406c of one or more layers to only partially fuse together. Inset 432 shows powder particles 410 that are partially fused together to form pores 408. Porous regions 406a, 406b and 406c may be detectable even if the spatter 404a, 404b and 404c is not. The detection may be using X-ray radiation (e.g., of the 3D object), or microscopy (e.g., inspecting a slice of the 3D object). The shape and size of the spatter-related porous regions can vary depending, in part, on the size and shape of the corresponding spatter. The debris may comprise spatter.

Figure 5A:
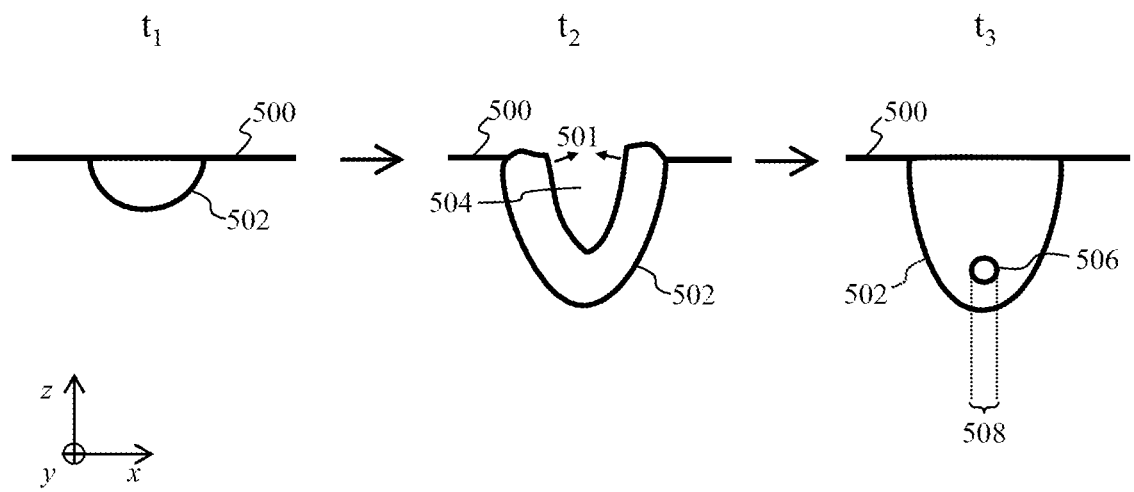
FIGS. 5A and 5B schematically illustrate various views of 3D objects.
Figure 5B:
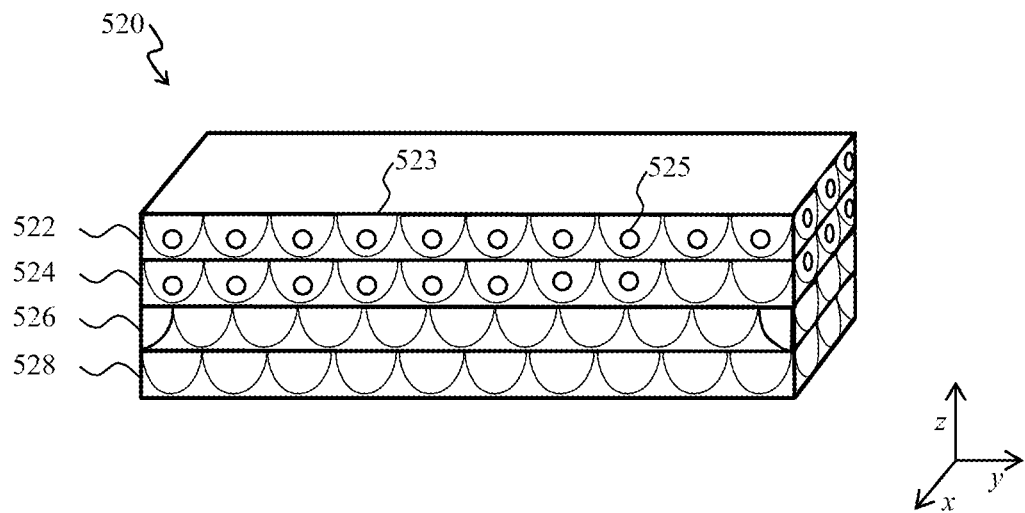

In some cases, the pores are associated with keyholing. Keyholing can occur when the laser beam has an intensity great enough to cause the molten material to evaporate (e.g., form gas), which may cause a void to form within a central region of the melt pool. Keyholing is often associated with forming high aspect ratio melt pools, where a depth of the melt pool is larger than a width of the exposed surface of the melt pool in at least one vertical cross section of the melt pool. FIG. 5A shows section views of a portion of an object experiencing keyholing. At a first time $t_1$, a laser beam first impinges upon the powder bed (e.g., 500) to form a melt pool (e.g., 502). At a second time $t_2$, the energy imparted by the laser beam is sufficiently high to form a keyhole (e.g., 504), corresponding to a voided region within a central region of the melt pool. The surface tension of the liquefied or partially liquefied material of the melt pool can cause edges of the keyhole toward each other, in accordance with arrows (e.g., 501). At a third time $t_3$, the edges of the keyhole can fuse together and form a porous region (e.g., 506) to remain within the central region of the melt pool. The porous region (e.g., 506) may have one or more pores (e.g., bubbles). The keyhole-related porous region can have a diameter (e.g., 508) that are (e.g., substantially) equal to or less than the diameter of its associated melt pool. In some embodiments, the average diameter (e.g., 508) of the melt pool in the porous region (e.g., 506) ranges between about 10 micrometer (μm) and about 500 μm. FIG. 5B shows a perspective view of an object (e.g., 520) having multiple keyhole-related porous regions (e.g., 525) residing within central regions of at least some of the melt pools (e.g., 523). In some cases, process conditions can be controlled to form keyhole-related porous regions within some layers (e.g., 522 and 524), while other layers (e.g., 526 and 528) are (e.g., substantially) pore-free. Keyhole-related pores can be formed by increasing the amount of energy delivered by the laser to the exposed surface of the powder bed. The increase in the amount of energy delivered can be (i) by increasing the laser power and/or (ii) by removing or partially removing an optical mask from a window (e.g., between printing operations). In some cases, the optical mask is removed (or partially removed) after melting a prescribed portion of the layer, a prescribed number layers of powder, or after a prescribed number of objects have been formed.

It should be noted that the shapes and sized of the pores may vary depending on how they are formed. For example, lack of fusion related pores described above with reference to FIGS. 3A-3B and 4 may have irregular shapes and differing sizes. For example, keyhole related pores described above with reference to FIGS. 6A-6B may have (e.g., substantially) spherical shapes.

The printing systems described herein can include one or more controllers that is configured to execute the methods used to form 3D objects having gradations of porosity and/or surface roughness. For example, one or more characteristics (e.g., peak intensity and/or focus) of the laser beam(s) can be changed during formation of a 3D object. The change can take place during melting of a single layer of powder, or take place during melting of multiple layers of powder. The change can be gradual or abrupt. The 3D object can have a pattern of porosity or surface roughness. In some embodiments, the pattern of porosity or surface roughness is a gradual increase or decrease in porosity or surface roughness as measured across an area or length of the 3D object. In some embodiments, the optical mask forms a first region of the 3D object having a porosity of greater than about 1% and a second region of the 3D object having a porosity of about 1% or less. In some embodiments, the optical mask forms a first region of the 3D object having a surface roughness (Ra) of greater than about 50 micrometers and a second region of the 3D object having a surface roughness of about 50 micrometers or less. Porosity can refer to the volume of voids as a percentage of a total volume of the 3D object. Surface roughness (Ra) can correspond to the arithmetic average of the absolute values of the profile height deviations from the mean line, recorded within the evaluation length, e.g., in accordance with American Society of Mechanical Engineers (ASME) B46.1 standards. In some applications, the surface roughness is measured along a surface of the 3D object that is at a prescribed angle in relation to the exposed surface of the powder bed and/or the support surface of the platform. Such surface roughness may stem from the layer-wise formation of the 3D object. Such surface roughness may relate to the height of the powder layer used to form a layer of solid material as part of the 3D object. The 3D object may comprise a plurality of layers having an average layering plane. In some embodiments, the surface roughness is measured along a surface of the 3D object that is at an angle relative to the average layering plane. The average layering plane may be (e.g., substantially) parallel to the exposed surface of the powder bed and/or the support surface of the platform, during the printing. The average layering plane may be (e.g., substantially) perpendicular to the gravitational field vector. The acute angle between the exposed surface (portion) and the average layering plane may range from about 1 degrees to about 30, 35, 45, 50, 80, or 85 degrees.

One way of controlling the one or more characteristics of laser beam(s) is by using one or more controllers operatively coupled to the printing system. For example, the controller(s) can be configured to increase and/or decrease the laser beam intensity while melting a layer of powder, and/or between melting layers of powder. In some cases, the one or more controllers are configured to cause the one or more optical elements to adjust the depth of field (effective focus range) of the laser beam(s) during a printing operation. In some embodiments, the change is based on input from the one or more sensors, such as thermal sensor that measure a thermal signal of the powder as it is being melted.

Figure 6A:
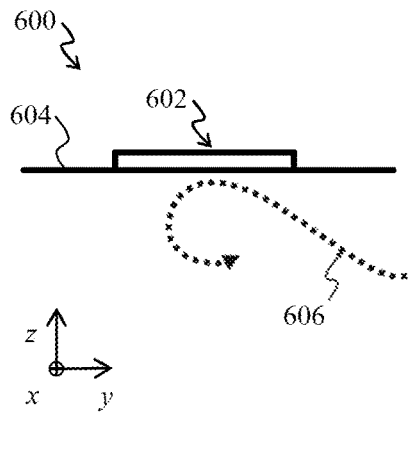
FIGS. 6A-6D schematically illustrate portions of 3D printers.
Figure 6B:
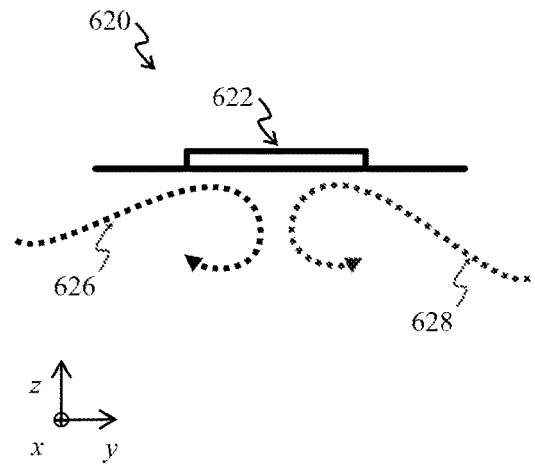
Figure 6C:
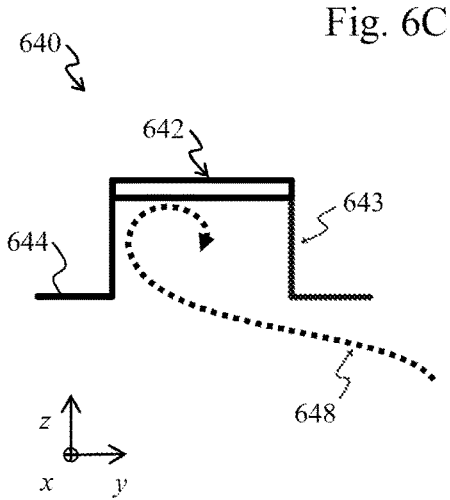
Figure 6D:
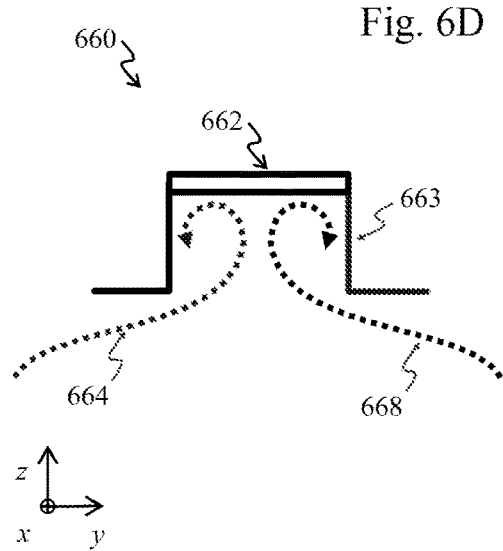

Another way of controlling characteristics of the laser beam(s) is by using an optical mask. The optical mask can be configured to absorb at least some of the energy (e.g., light) of the laser beam before the laser beam reaches the powder bed. The optical mask may be disposed on an optical element, such as a mirror or a window, where a path of the laser beam travels. In some embodiments, the optical mask is formed by a stream of particles that progressively deposits the particles on the optical element during a printing operation. FIGS. 6A-6D show section views of windows of 3D printing systems, indicating streams of particles that form various optical masks, in accordance with some embodiments. FIG. 6A shows printing system 600 having a window 602 coupled to an enclosure having a wall 604 and configured to allow a laser beam to travel therethrough to an internal volume of the enclosure (e.g., a processing chamber). The internal surface of the window (e.g., 602) can (e.g., substantially) flush with an internal surface of the enclosure wall (e.g., 604). A stream of particles (e.g., 606), which corresponds to a flow of gas that has entrained particles, can be configured to carry particles toward an internal surface of the window to deposit at least a portion of the particles on the internal surface. The stream of particles (e.g., 606) can be provided by a turbulent movement of gas within the enclosure (e.g., processing chamber). The turbulent movement may include a cyclic (e.g. circulating) movement, a backflow, a vortex and/or a chaotic movement. FIG. 6B shows a printing system 620 where a plurality (e.g., two) streams of particles 626 and 628 are configured to carry and deposit particles onto an internal surface of a window 622. The plurality of streams may be symmetric or asymmetric (e.g., having a mirror symmetry). FIG. 6C shows printing system 640 having a recessed portion 643 that recesses window 642 with respect to an internal surface of an enclosure 644. A stream of particles (e.g., 648) can enter the recessed portion and deposit particles onto the internal surface of the window (e.g., 642). In some cases, the recessed portion (e.g., 643) can cause the stream of particles to change course (e.g., recirculate) within the recessed portion. The change of course may comprise a turbulent movement (e.g., a backflow). FIG. 6D shows printing system 660 having a window 662 that is recessed in recessed portion 663, with a plurality (e.g., two) streams of particles 664 and 668 entering the recessed portion for depositing particles onto the internal surface of window 662. The plurality of streams may be symmetric or asymmetric (e.g., having a mirror or rotational symmetry).

Figure 7A:
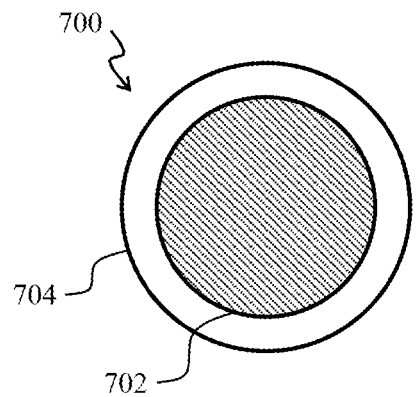
FIGS. 7A and 7B schematically illustrate section views of particles.
Figure 7B:
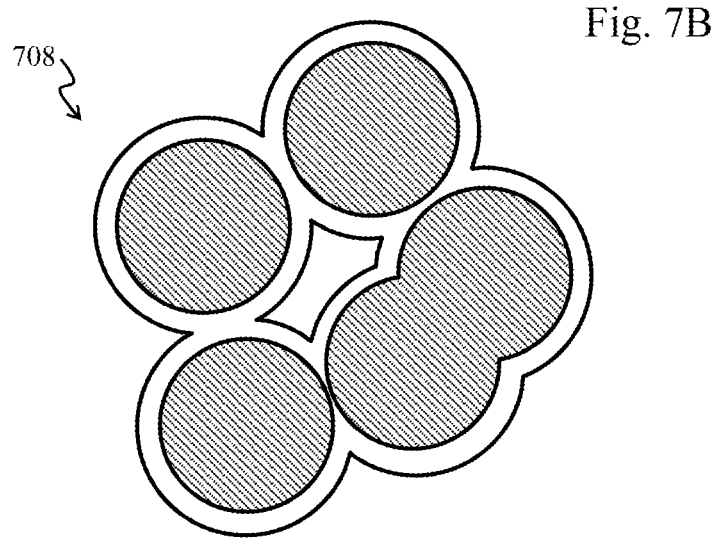

The optical mask can be composed of any suitable type of particles. The particle may comprise a powder, splatter, spatter, or soot. The powder may be the starting material used for the 3D printing. In some embodiments, the particles are comprised of an organic material, such as a polymer material. The particles may comprise elemental metal or a metal alloy. In some embodiments, the particles are comprised of a metal material, such iron, nickel, titanium, chromium, and/or aluminum, or alloys of metals such as steel or Inconel. In some embodiments, the particles are comprised of a metal oxide, such iron oxide, titanium oxide, and/or aluminum oxide. In some embodiments, the particles are comprised of material formed during the printing process. For example, melting of the powder may generate particles near the exposed surface of the powder bed chamber during the printing process, which can become gasborne and travel into the atmosphere of the processing chamber. In some cases, such particles are continuously generated and expelled into the internal volume of the processing chamber. In some cases, the particles exit the surface of the powder bed as plumes of gas-borne particles. The gas-borne particles can include powder particles that are melted, sintered, or partially melted or sintered. The gas-borne particles may include powder that was not melted. The gas-borne particles can include particles of partially or fully oxidized metal (e.g., metal oxide). In some cases, the gas-borne particles include particles having diameters ranging from about 0.1 micrometers (μm) to about 1 um. In some cases, the particles comprise smaller particles (e.g., less than 0.1 micrometers). FIG. 7A shows a section view of an example soot particle 700. In some cases, the soot particles include about 70% to about 95% metal 702 (e.g., core) and about 5% to about 30% metal oxide 704 (e.g., outer shell) by volume. In some cases, the soot particles include at least about 10% metal oxide by volume. The oxide layer may cover the particle core at least in part. In some cases, the soot particles fuse together in clusters. FIG. 7B shows a section view of an example of a cluster of soot particles 708.

The rate of gas-borne particle production within the processing chamber can depend, in part, on the rate of melting of the powder. Melting may comprise fully melting or partially melting (e.g., sintering). In some applications, the rate of melting is at least about 1 cubic centimeters per hour (cm$^3$/hr), 2 cm$^3$/hr, 3 cm$^3$/hr, 4 cm$^3$/hr, 5 cm$^3$/hr, 10 cm$^3$/hr, 20 cm$^3$/hr, 30 cm$^3$/hr, 40 cm$^3$/hr, 50 cm$^3$/hr, 100 cm$^3$/hr, 150 cm$^3$/hr, 200 cm$^3$/hr, 250 cm$^3$/hr, 300 cm$^3$/hr, 400 cm$^3$/hr, or 500 cm$^3$/hr per laser. The rate of melting may range between any of the afore-mentioned values (e.g., from about 1 cm$^3$/hr to about 500 cm$^3$/hr, from about 5 cm$^3$/hr to about 100 cm$^3$/hr, from about 100 cm$^3$/hr to about 500 cm$^3$/hr, or from about 1 cm$^3$/hr to about 50 cm$^3$/hr) per laser. In some embodiments, the rate of gas-borne particle production is at least about 10 micrograms per second (μg/sec), 50 μg/sec, 100 μg/sec, 200 μg/sec, 300 μg/sec, 400 μg/sec, 500 μg/sec, 1 milligram (mg/sec), 5 mg/sec, or 10 mg/sec per laser. The rate of gas-borne particle production may range between any of the afore-mentioned values (e.g., from about 10 μg/sec to about 10 mg/sec, from about 300 μg/sec to about 10 mg/sec, from about 10 μg/sec to about 300 μg/sec, or from about 10 μg/sec to about 5 mg/sec) per laser. Other factors that may influence the rate of gas-borne particle production can include one or more characteristics the power density of the laser beam(s) at the surface of the powder bed. The laser power density can vary depending on the type of laser(s) and desired process conditions for particular applications. In some embodiments, the laser power density ranges from about 100 Kilo Watts per centimeter squared (kW/cm$^2$) to about 30,000 kW/cm$^2$ per laser.

In some embodiments, the printing apparatus includes a gas flow system for controlling the rate at which the particles deposit onto the internal surface of the window. FIG. 8 shows a section view of a portion of 3D printer having an enclosure 800 that includes a gas flow system. The gas flow system can include an inlet region (e.g., 825), which includes one or more inlet ports (e.g., 804) that is/are operationally coupled with a gas source. The gas source may provide an inert gas, such as nitrogen and/or argon. The inert gas may be (e.g., substantially) non-reactive (e.g., non-chemically reactive) with the powder during a printing operation. In some embodiments, the inlet region includes a wall (e.g., 805) that separates the inlet region from the internal volume (e.g., 827) of the processing chamber (e.g., 826). The gas can enter the inlet region at the one or more inlet ports and exit the inlet region via one or more inlet openings (e.g., 807). In some embodiments, the one or more inlet ports correspond to the one or more inlet openings (e.g., in case wall 805 does not exist). The inlet region can include any suitable number of inlet ports and/or inlet openings (e.g., at least 1, 2, 3, 4, 5, 6, 7, 8, 9, or 10). In some embodiments, the inlet ports and/or inlet openings correspond to openings within, or comprise: a perforated plate, a screen, a mesh or a gas permeable material.

The gas flow system can include an outlet region (e.g., 806), which includes one or more outlet openings (e.g., 808) for the flow of gas to exit the processing chamber. In some cases, the gas may flow through the processing chamber (at least in part) toward the outlet openings due to a pressure difference between the inlet and outlet regions. In some cases, the one or more outlet openings (e.g., fluidly) coupled one or more pumps that assist movement of the gas through the processing chamber. The pump(s) may include a positive displacement pump (e.g., rotary) and/or a vacuum pump (e.g., Venturi). The one or more outlet openings can be operationally coupled with a gas recycling system that recycles the gas back through the one or more inlet ports (e.g., after filtering out debris). The outlet region can include any suitable number of outlet openings (e.g., at least 1, 2, 3, 4, 5, 6, 7, 8, 9, or 10). In some embodiments, the one or more outlet openings correspond to openings in, or comprise: a perforated plate, a screen, a mesh or a gas permeable material. The inlet and outlet regions can be coupled to any wall of the processing chamber. For example, the inlet and/or outlet regions may be coupled to side walls (e.g., wall 812 or wall 805), a ceiling (e.g., 817), and/or a floor (e.g., 811) of the processing chamber.

In some embodiments, the inlet port(s), inlet opening(s), and/or outlet opening(s) are operationally coupled to one or more valves and/or nozzles. The valve(s) and/or nozzle(s) can control an amount (e.g., on or off) and/or a velocity of the flow of gas into the processing. The valve(s) and/or nozzle(s) may be controlled manually or automatically (e.g., using one or more controllers). The nozzle(s) may include jet (e.g., gas jet) nozzle, high velocity nozzle, propelling nozzle, magnetic nozzle, spray nozzle, vacuum nozzle, Venturi nozzle, or shaping nozzle (e.g., a die). The nozzle can be a convergent or a divergent nozzle. The spray nozzle may comprise an atomizer nozzle, an air-aspirating nozzle, or a swirl nozzle.

According to some embodiments, the inlet and outlet regions are positioned so as to provide a primary flow of gas (e.g., 803) over at least part of the exposed surface (e.g., 810) of the powder bed (e.g., 824). The particles generated at the exposed surface of the powder bed can become entrained with the flow of gas (e.g., 803) and exit the processing chamber via the outlet region. In this way, the primary flow of gas (e.g., 803) can be used to remove some of the gas-borne particles from the processing chamber as they are being generated. In some cases, the inlet region is along one side wall of the processing chamber, and the outlet region is along an opposing side wall of the processing chamber. The openings and/or interior walls of the processing chamber may be configured to facilitate a flow of gas along the surface of the powder bed (e.g., laterally) across a width or length of the processing chamber. In some cases, the inlet region is along the ceiling (e.g., 817) of the processing chamber and the outlet region is along one or more side walls (e.g., wall 812 or wall 805) and/or the floor (e.g., 811) of the processing chamber. The flow of gas can travel toward the powder bed, then travel along the surface of the powder bed before exiting the outlet opening. At least a portion of the primary flow of gas can flow laminarly at least above the surface of powder bed. At least a portion of the primary flow of gas can be (e.g., substantially) parallel to the surface of powder bed. A (e.g., substantially) parallel flow of gas can be in a direction that is about 0 degrees (°), 1°, 5°, 10°, 20°, 30° or 40° relative to the exposed surface of the powder bed and/or the platform. In some embodiments, at least a portion of the primary flow of gas is (e.g., substantially) laminar immediately above the powder bed, for example, just above the exposed surface (e.g., 810).

The primary flow of gas (e.g., 803) can create a secondary flow of gas 818 that recirculates and redistributes some of the gas-borne particles within the processing chamber. An internal shape of the processing chamber may be configured to facilitate the recirculating movement of the gas-borne particles. The openings and/or interior walls of the processing chamber may be configured to facilitate a flow of gas towards the window(s). For example, a wall (e.g., 812 (e.g., a side wall)) of the processing chamber may facilitate movement of the secondary flow of gas (e.g., 818) to a region of the processing chamber proximate to the windows (e.g., 815 and 816). In some embodiments, the secondary flow of gas has a vertical (e.g., upward) component, which is opposite a direction toward the powder bed (e.g., 824). The secondary flow of gas (e.g., 818) can include entrained gas-borne particles, and therefore can bring particles generated at the powder bed to the internal surface of the windows. In this way, secondary flow of gas can correspond to a stream of particles that cumulatively forms optical masks on the windows. The recirculating flow of gas can be referred to as a backflow. In some embodiments, the recirculating flow is in accordance with a turbulent movement. The turbulent movement can include a cyclic (e.g. circulating) movement, a backflow, a vortex and/or a chaotic movement. In embodiments where the windows are recessed within recessed portions (e.g., 820 and 822, respectively), the secondary flow of gas (e.g., 818) can travel within the walls of the recessed portion. The rate of particle deposition onto the windows may depend, in part, on a (e.g., vertical) distance (e.g., 829) between the windows and the surface (e.g., 810) of the powder bed (e.g., 824), the gas flow velocity, and/or the concertation of the particles in the gas flow. In some embodiments, distance (e.g., 824) ranges from about 10 centimeters (cm) and about 100 cm.

Figure 9:
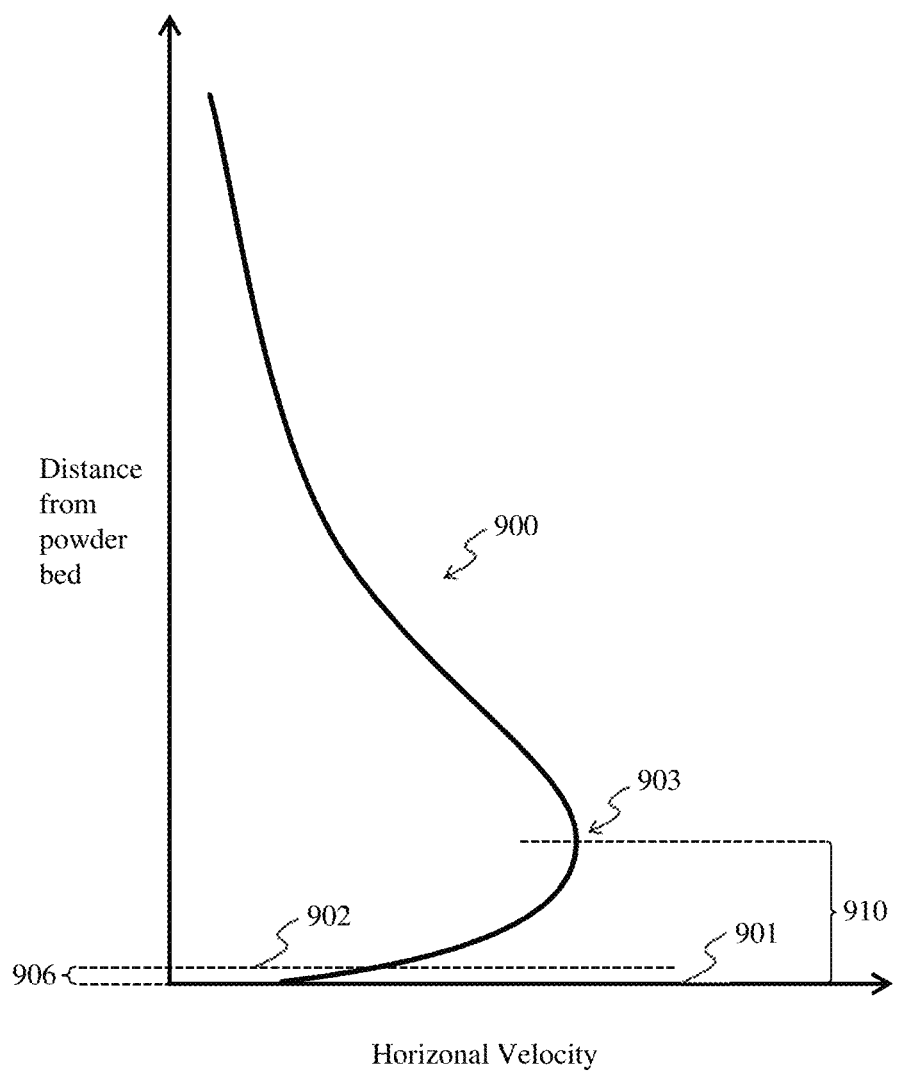
FIG. 9 illustrates a graph indicating gas flow parameters.

The number of particles deposited on the window(s) can depend, in part, on the velocity of the stream of particles at the internal surface of the window(s), which can be controlled by controlling one or more characteristics of the primary flow of gas. In some embodiments, at least a portion of the primary flow of gas is in a direction that is (e.g., substantially) parallel to the exposed surface of the powder bed. In some cases, the primary flow of gas is in a (e.g., substantially) horizontal direction. A substantially horizontal flow of gas can be in a direction that is about 60°, 70°, 80°, 85°, 89° or 90° with respect to a gravity vector. FIG. 9 shows a profile 900 indicating horizontal velocity of a primary flow of gas within a processing chamber as a function of distance from a surface 901 of the powder bed, in accordance with some embodiments. The gas flow can have a peak horizontal velocity (e.g., 903) at a peak velocity height (e.g., 910) in relation to the exposed surface (e.g., 901) of the powder bed. The peak velocity height (e.g., 910) can vary depending on a number of factors including the positions (e.g., heights) of the inlet and outlet openings and/or the lateral distance along the length of the powder bed and/or the platform, and/or the internal shape of the enclosure. In some embodiments, the peak velocity height (e.g., 910) is at least about 5 mm, 6 mm, 7 mm, 8 mm, 9 mm, 10 mm, 12 mm, 15 mm, 20 mm, 25 mm, 30 mm, 40 mm, 50 mm, 60 mm, 70 mm, 80 mm, 90 mm, 100 mm, 120 mm, 150 mm, or 200 mm from the exposed surface of the powder bed and/or platform. The peak velocity height (e.g., 910) can range between any of the afore-mentioned values (e.g., from about 5 mm to about 200 mm, from about 1 mm to about 30 mm, from about 30 mm to about 200 mm, from about 15 mm to about 50 mm, or from about 15 mm and about 100 mm) above the surface of the powder bed and/or platform. The peak velocity height (e.g., 910) can be above a height (e.g., 902) of a boundary layer, which refers to a region immediately above the surface of the powder bed where effects of viscosity may be significant such that horizontal velocity immediately across the powder bed may be relatively low. In some embodiments, the height (e.g., 902) of the boundary layer is at most about 1 mm, 2 mm, 3 mm, 4 mm, 5 mm, 6 mm, 7 mm, 8 mm, 9 mm or 10 mm from the surface of the powder bed.

In some cases, the flow of gas is continuously provided in the processing chamber during a printing operation. In some cases, the flow of gas is provided in the processing chamber during only a portion of the printing operation. In some cases, the velocity of the flow of gas remains (e.g., substantially) the same during the printing operation. In some cases, the velocity of the flow of gas is varied during the printing operation. In some cases, the velocity of the flow of gas is continuous during the printing operation (e.g., and during the build). In some cases, the velocity of the flow of gas is intermittent during the printing operation. For example, a flow of gas may persist during irradiation of the laser, and cease during planarization of the exposed surface of the powder bed. One or more valves of the inlet port(s), inlet opening(s) and/or outlet opening(s) can be used to control the velocity and or amount (e.g., on/off) of the flow of gas. In some cases, the velocity (i.e., volumetric flow rate) of the flow of gas is at least about 0.01 m/s, 0.05 m/s 0.1 m/s, 0.5 m/s, 1 m/s, 2 m/s, 3 m/s, 5 m/s, 10 m/s, 15 m/s, 20 m/s, 30 m/s or 50 m/s. The velocity of the flow of gas can be at most about 0.1 m/s, 0.2 m/s, 0.3 m/s, 0.5 m/s, 0.7 m/s, 0.8 m/s, 1 m/s, 2 m/s, 3 m/s, 5 m/s, 10 m/s, 15 m/s, 20 m/s, 30 m/s, or 50 m/s. The velocity of the flow of gas can be between any of the afore-mentioned values (e.g., from about 0.01 m/s to about 50 m/s, from about 0.01 m/s to about 2 m/s, from about 2 m/s to about 50 m/s, or from about 0.2 m/s to about 2 m/s). The velocity can be measured using any suitable technique(s) and device(s). For example, one or more flow meters (e.g., anemometer, sonar flow meter, air flow meter, particle image velocimetry device, or laser Doppler velocimetry device) may be used to measure the gas flow velocity across one or more prescribed distances above the surface of the powder bed.

In some embodiments, the gas-borne particles within the processing cone region is reduced by allowing a gas (e.g., an inert gas, clean air, or an external atmosphere) to enter the internal volume of the processing chamber. The gas can displace (purge) at least some of the gas-borne particles, thereby reducing its concentration in the processing cone region. In some embodiments, the purging gas enters the processing chamber when the build module is separated from the processing chamber. The purging gas may be allowed to enter before, during or after a printing operation (e.g., between builds). The external atmosphere may be allowed to enter before, during or after a printing operation (e.g., between builds). The entry of the gas may be controlled manually and/or automatically (e.g., using on or more controllers).

Figure 10A:
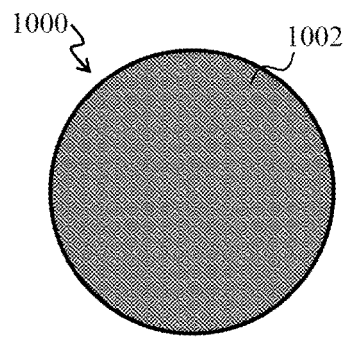
FIGS. 10A-10F schematically illustrate plan views of masks.
Figure 10B:
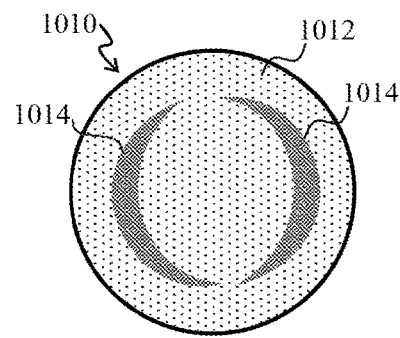
Figure 10C:
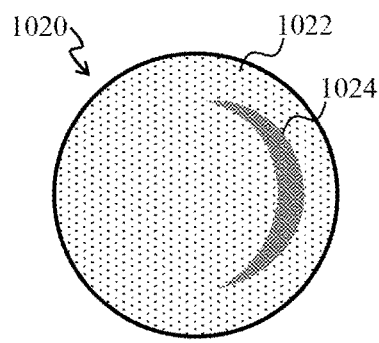
Figure 10D:
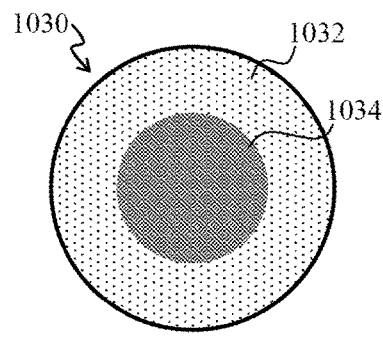
Figure 10E:
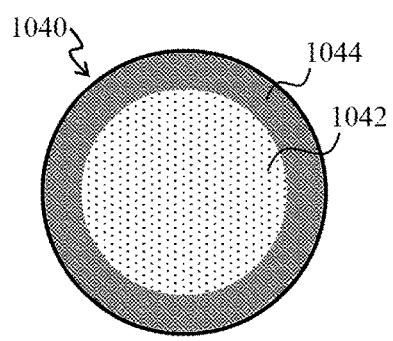
Figure 10F:
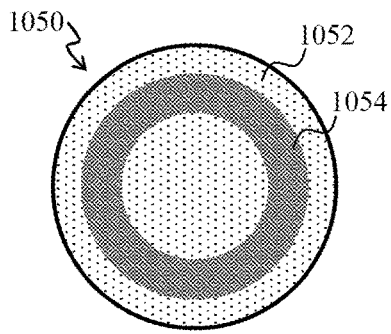

In some cases, an amount of energy absorbed by the optical mask changes during a printing operation. For example, the gas flow system can be configured to cause particles to progressively accumulate on the window such that the accumulated particles progressively absorb more light. In some cases, the particles accumulate in a pattern on the window. In some cases, the particles accumulate in a preferred location on the window. In some cases, the particles accumulate randomly in at least a portion of the window. In some cases, the pattern of deposited particles can be detectable by an optical detector (or by human eye) as darker and lighter regions of the optical mask on the window, with the darker regions having a thicker coating of particles and absorbing more laser energy than the lighter regions. FIGS. 10A-10F show aerial perspectives of various optical windows showing examples of optical masks with different patterns, in accordance with some embodiments. FIG. 10A shows window 1000 with an optical mask 1002 having an (e.g., substantially) uniformly distributed thickness of particles. FIG. 10B shows window 1010 with an optical mask having a first portion 1012 with a thinner coating of particles and a second portion 1014 with a thicker coating of particles, where the second portion 1014 corresponds to two crescent-shaped regions of higher absorption. FIG. 10O shows window 1020 with an optical mask having a first portion 1022 with a thinner coating of particles and a second portion 1024 with a thicker coating of particles, where the second portion 1024 corresponds to a single crescent-shaped region of higher absorption. FIG. 10D shows window 1030 with an optical mask having a first portion 1032 with a thinner coating of particles and a second portion 1034 with a thicker coating of particles, where the second portion 1034 corresponds to a circular-shaped region of higher absorption at a center of the window. FIG. 10E shows window 1040 with an optical mask having a first portion 1042 with a thinner coating of particles and a second portion 1044 with a thicker coating of particles, where the second portion 1044 corresponds to a ring-shaped region of higher absorption at a perimeter of the window. FIG. 10F shows window 1050 with an optical mask having a first portion 1052 with a thinner coating of particles and a second portion 1054 with a thicker coating of particles, where the second portion 1054 corresponds to a ring-shaped region of higher absorption at a region between the center and perimeter of the window. It should be noted that the window can have any suitable shape, and is not limited to a round (circular) shape as shown in FIGS. 10A-10F. In some embodiments, the window has a polygonal (e.g., square, rectangular, or triangular), oval or elliptical shape.

The pattern of the optical mask (i.e., regions of lower and higher absorption) can be controlled (e.g., manually and/or automatically, e.g., using at least one controller). For example, the pattern may be controlled by the direction of the stream of particles with respect to the internal surface of the window, and/or structures of (and/or in) the processing chamber that direct the stream of particles at select regions of the window. Returning to FIGS. 6A-6D, for example, the internal surface of the window can be (e.g., substantially) flush with internal surface of the processing chamber (e.g., FIGS. 6A and 6B), or walls of a recessed portion of the processing chamber can partially occlude select portions of the window (e.g., FIGS. 6C and 6D). That is, the walls of the recessed portion of processing chamber can act as baffles that deflect the stream of particles from some regions of the window and/or toward other regions of the window.

The optical mask can modify characteristics (e.g., peak intensity and/or focus) of the laser beam prior to the laser beam reaching the exposed surface of the powder bed. In some embodiments, the optical mask forms on the internal surface of a window that is within the internal volume of the processing chamber. Thus, in some embodiments, the optical mask modifies the characteristics of the laser beam while the laser beam is within the processing chamber.

Figure 17:
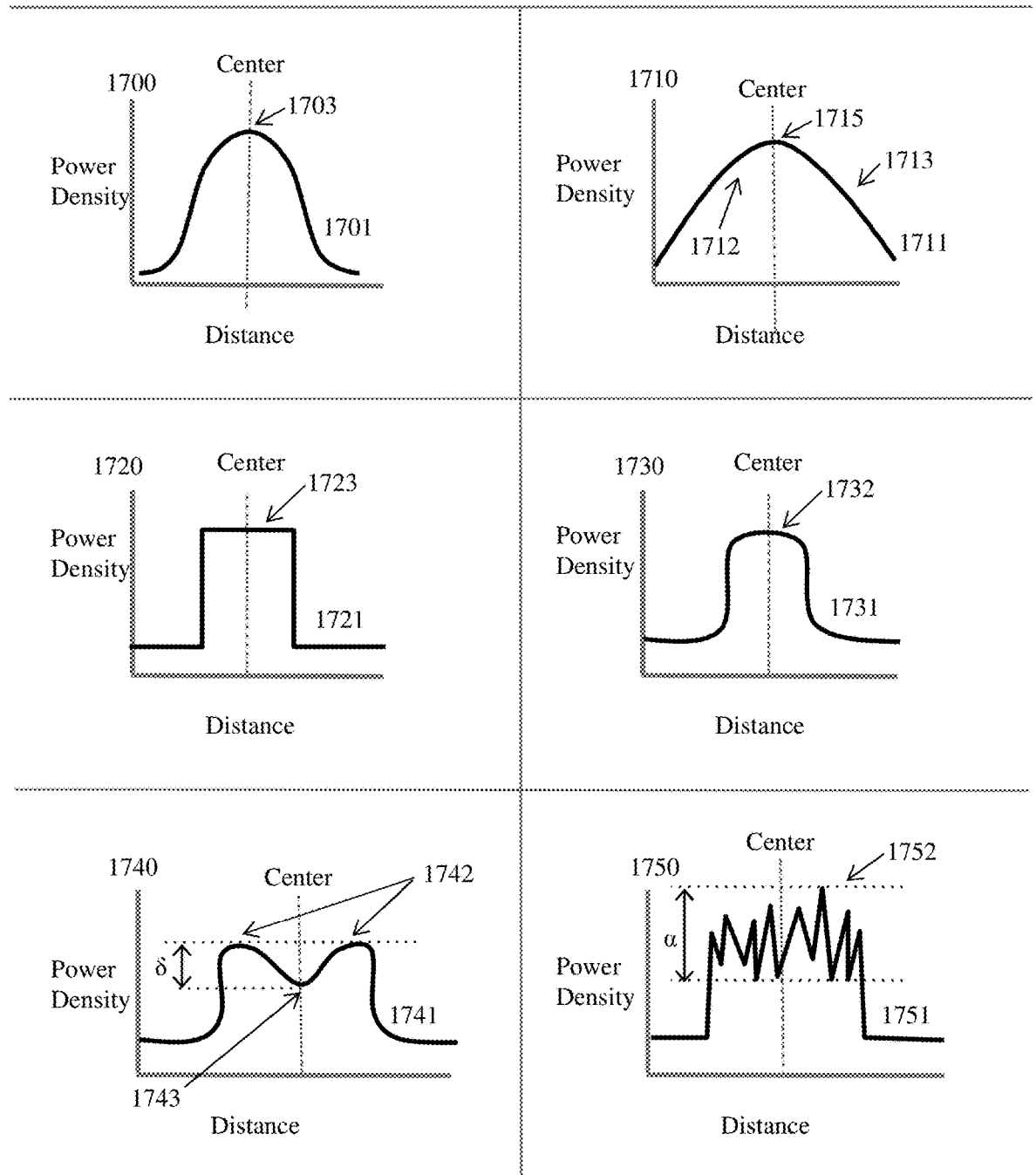
FIG. 17 schematically illustrates power density profiles of various energy beams.

The absorption by the optical mask can vary during printing. When this occurs, the methods can be used to (e.g., predictably) determine the rate in which absorption by the optical mask changes. In some embodiments, these methods include determining a peak power density of the laser beam at the target surface (e.g., exposed surface of the powder bed). The peak power density of the laser beam may vary depending on the spatial distribution of the energy of the laser beam. FIG. 17 show examples of power density profiles at a target surface using various laser beams. Graph 1700 shows a power density profile 1701 using a laser beam having a shape in accordance with a Gaussian curve, where the peak power density 1703 is (e.g., substantially) in the center of the laser beam cross-section. Graph 1710 shows a power density profile 1711 characterized as having a gradually increasing section 1712 and gradually decreasing section 1713, wherein the peak power density 1715 is (e.g., substantially) in the center of the laser beam cross-section. Graph 1720 shows a power density profile 1721 having a peak power density 1723 within a central plateau region of the laser beam cross-section (e.g., top hat laser beam shape). Graph 1730 shows a power density profile 1731 having a peak power density 1732 within a central plateau region (e.g., top hat laser beam shape) that less abruptly transitions between power density maximum(s) and minimum(s) compared to that of profile 1721. Graph 1740 shows a power density profile 1741 having two peak power densities regions 1742 separated by a central region 1743 having a lower power density (by delta "δ"). Graph 1750 shows a power density profile 1751 with a central peak power density region 1752 having a fluctuating power density. The peak power density can correspond to a calculated average power density of the range (alpha "α") of values within the peak power density region 1752.

Figure 11:
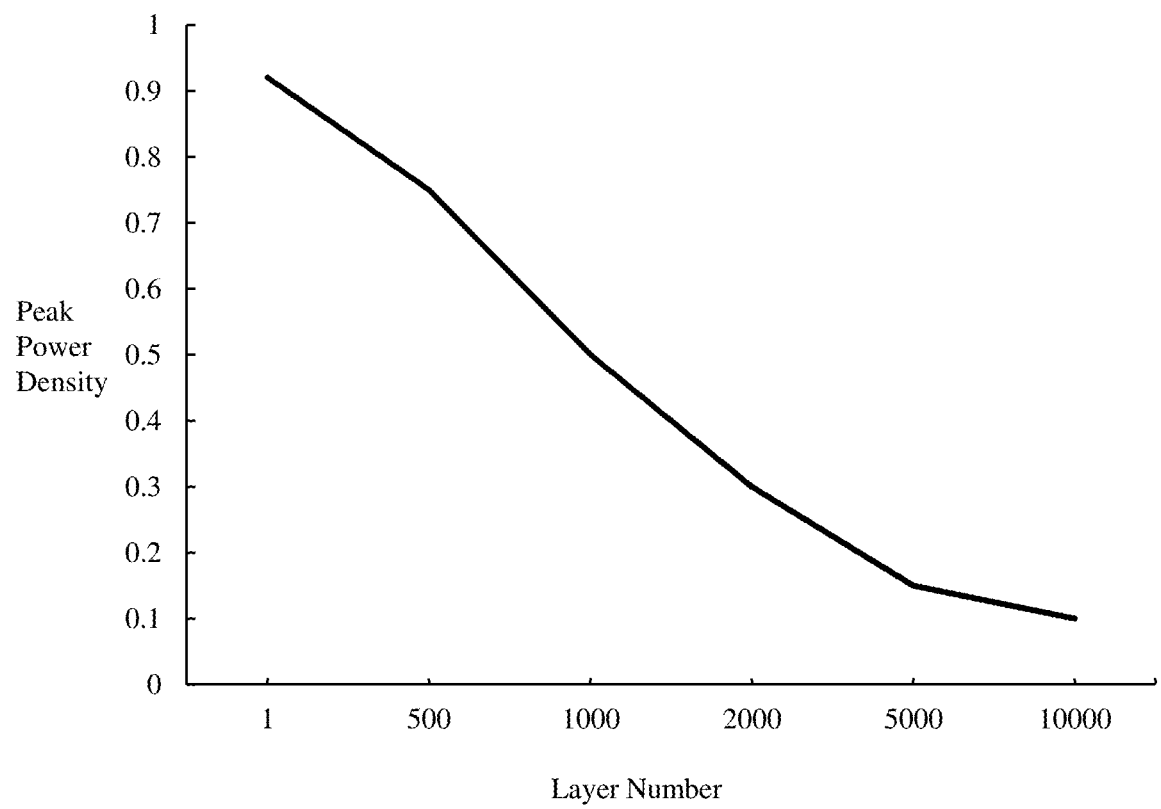
FIG. 11 illustrates a graph indicating laser beam peak power density changes.

The FIG. 11 shows a graph indicating changes in the peak power density (normalized) of a laser beam at a target surface due to a progressively absorbing optical mask, in accordance with some embodiments. The intensity of a laser beam transmitted through a window accumulating an optical mask was measured after melting 1, 500, 1000, 2000, 5000 and 10000 layers of powder. The peak power density of the laser beam at a target surface (e.g., exposed surface of a powder bed) was calculated based on the intensity measurements. The graph of FIG. 11 indicates a relationship between an amount of molten material and an amount of variation of the peak power density due to an evolving optical mask that comprises an accumulating amount of material (e.g., accumulating particles). The evolving optical mask may reduce the peak power density with increasing number of powder layers that are processed (e.g., by the laser beam).

Figure 12A:
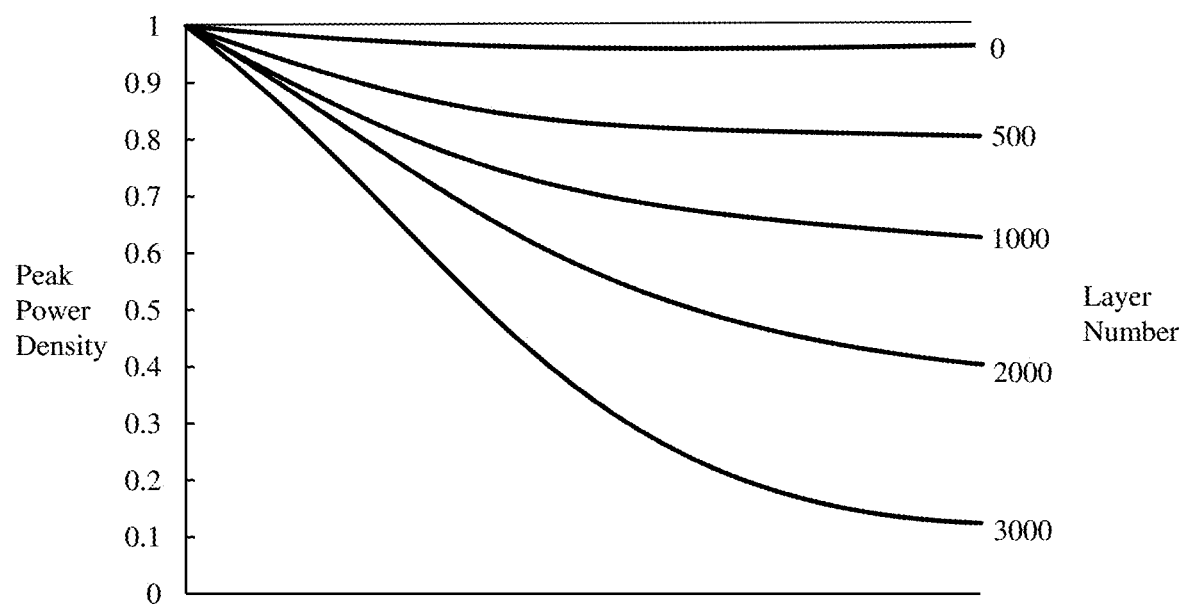
FIGS. 12A and 12B illustrate graphs indicating laser beam power density changes.
Figure 12B:
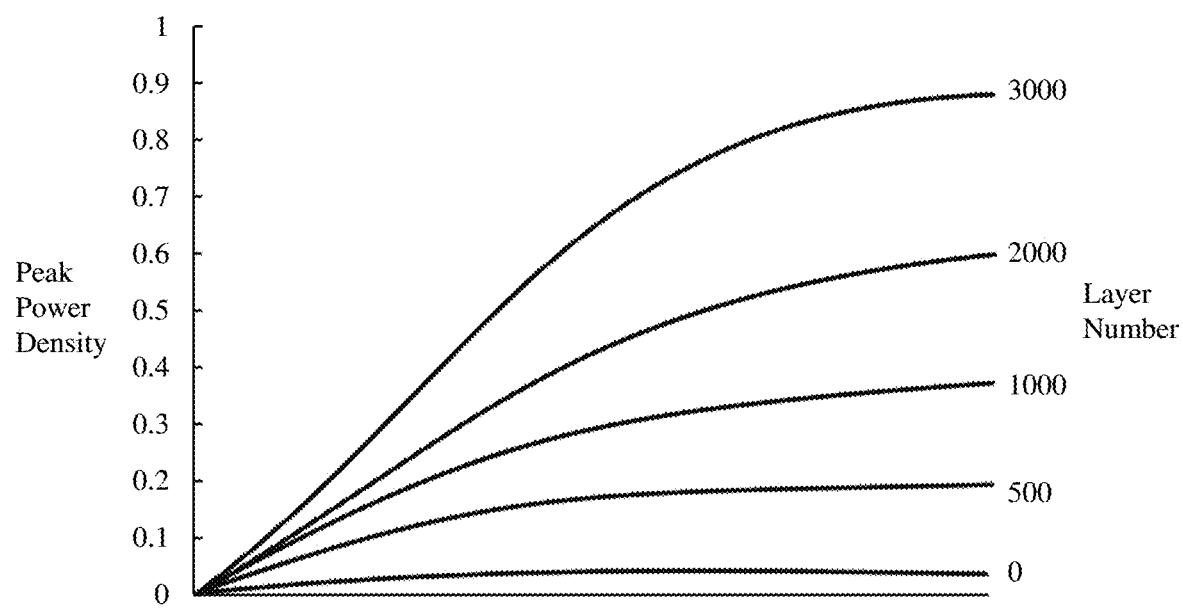

In some embodiments, the peak power density of the laser beam varies during melting of each layer of powder (e.g., portion thereof) and/or varies differently depending on which layer of the 3D object is being printed. Without being bound to theory, this variation may be due to optical distortion influenced by a built-up thermal effects. FIGS. 12A and 12B show example graphs indicating (normalized) peak power density of a laser beam on a target surface over time, in accordance with some embodiments. FIG. 12A illustrates embodiments where the peak power density decreases during the melting of various layers of powder. For example, the peak power density decreases during the printing of layer 500, layer 1,000, layer 2,000 and layer 3,000 of a build. In addition, the peak power density decreases more with each successive layer. For example, the peak power density during printing of layer 1,000 decreases by a greater percentage than during printing of layer 500; the peak power density during printing of layer 2,000 decreases by a greater percentage than during printing of layer 1,000; and the peak power density during printing of layer 3,000 decreases by a greater percentage than during printing of layer 2,000. FIG. 12B illustrates example embodiments where the peak power density increases during the melting of various layers of powder. For example, the peak power density increases during the printing of layer 500, layer 1,000, layer 2,000 and layer 3,000 of a build. In addition, the peak power density increases more with each successive layer. For example, the peak power density during printing of layer 1,000 increases by a greater percentage than during printing of layer 500; the peak power density during printing of layer 2,000 increases by a greater percentage than during printing of layer 1,000; and the peak power density during printing of layer 3,000 increases by a greater percentage than during printing of layer 2,000.

The optical mask can cause laser beam peak power density to vary with respect to a volume of molten material that is formed. The amount of molten material formed during printing of each layer and during an overall printing operation can vary depending on particular applications. However, laser beam peak power density variation cause by the optical mask can generally increase with the volume of molten material formed. For example, in some embodiments, the optical mask causes the peak power density to vary by at least about 2%, 3%, 4%, 5%, 10% or 15% after forming a first amount of molten material compared to the window without the optical mask. The first amount of molten material can be at least about 2000 cm$^3$, 2500 cm$^3$, 3000 cm$^3$, 2500 cm$^3$, or 4000 cm$^3$. The optical mask can cause the peak power density to vary between any of the afore-mentioned values (e.g., from about 2% to about 15%, from about 2% to about 5%, from about 5% to about 15%, or from about 3% to about 5%) after forming the first amount of molten material compared to the window without the optical mask. In some embodiments, the density of the deposited mask (e.g., particles) on the window after forming the first amount of molten material is at least about 1 nanograms per square millimeters (ng/mm$^2$), 10 ng/mm$^2$, 30 ng/mm$^2$, 50 ng/mm$^2$, 70 ng/mm$^2$, or 100 ng/mm$^2$. In some embodiments, the density of the deposited mask on the window after forming the first amount of molten material ranges between any of the afore-mentioned amounts (e.g., from about 1 ng/mm$^2$ to about 100 ng/mm$^2$, from about 1 ng/mm$^2$ to about 50 ng/mm$^2$, from about 20 ng/mm$^2$ to about 70 ng/mm$^2$, or from about 50 ng/mm$^2$ to about 100 ng/mm$^2$). In some embodiments, the optical mask causes the peak power density to vary by at least about 5%, 6%, 7%, 8%, 9%, 10%, 15%, 20%, or 30% after forming a second amount of molten material (e.g., powder) compared to the window without the optical mask. The second amount of molten material can be at least about 4500 cm$^3$, 5000 cm$^3$, 5500 cm$^3$, or 6000 cm$^3$. The optical mask can cause the peak power density to vary between any of the afore-mentioned values (e.g., from about 5% to about 30%, from about 5% to about 15%, from about 15% to about 30%, or from about 5% to about 10%) after forming the second amount of molten material compared to the window without the optical mask. The percentages are measured volume per volume. In some embodiments, the density of the deposited mask on the window after forming the second amount of molten material is at least about 50 ng/mm$^2$, 70 ng/mm$^2$, 100 ng/mm$^2$, 150 ng/mm$^2$, 200 ng/mm$^2$, 300 ng/mm$^2$, or 500 ng/mm$^2$. In some embodiments, the density of the deposited mask on the window (density of the mask) after forming the second amount of molten material ranges between any of the afore-mentioned amounts (e.g., from about 50 ng/mm$^2$ to about 500 ng/mm$^2$, from about 100 ng/mm$^2$ to about 500 ng/mm$^2$, from about 50 ng/mm$^2$ to about 250 ng/mm$^2$, or from about 250 ng/mm$^2$ to about 500 ng/mm$^2$).

Once the peak power density reduction is measured over a printing operation or several printing operations, the peak power density reduction can be predicted in subsequent printing operations. This information can be used to predict corresponding changes in the 3D object. For example, a first 3D object can be printed using predetermined process conditions (e.g., predetermined laser beam power and gas flow velocity), where the peak power density evolution over time is measured between melting a number of layers (or volumes) of melted material. The first 3D object is then examined to determine at which layer (or volume, respectively) of melted material that the optical mask reduced the laser beam intensity to a level sufficient for pores and/or surface roughness to occur in the first 3D object. Subsequent (e.g., second, third and fourth) 3D objects having (e.g., predictably located) pores and/or surface roughness can then be printed using the same process conditions. Furthermore, the process conditions (e.g., laser beam power and/or gas flow velocity) can be adjusted to achieve porosity and/or surface roughness at select locations within a 3D object. Moreover, process conditions can be chosen such that optical mask gradually increases light absorption at a predetermined rate, such that corresponding gradual changes in porosity and/or surface roughness manifest in the 3D object.

In some embodiments, the optical mask is removed, or partially removed, from the window during or between printing operations. For example, the optical mask may be removed after it is determined that the laser beam peak power density is reduced to or above a threshold percentage. In some embodiments, the optical mask is removed by cleaning (e.g., removing, wiping or ablating) the particles off the internal surface of the window. The cleaning can be done manually or automatically (e.g., using a controller) during or after the 3D printing. When the cleaning is done during the printing, printing subsequent to the cleaning can be done, where a new optical mask is progressively formed on the internal surface of the window. Repetitive formation of masks during the 3D printing may form repetitive gradually porous structure in the object (e.g., a series of pore graduations in the 3D object).

The 3D printers described herein can include one or more controllers that are operatively coupled with one or more components of the 3D printer, which one or more controllers direct(s) operation of the one or more components. In some cases, the controller(s) control the motion of one or more components. The one or more controllers can be part of a control system. The control system may be able to receive signals relating to the one or more components to be used (e.g., in feedback, feed-forward, open loop, and/or closed loop control schemes). The operations can be before, during and/or after a printing operation. For example, the controller(s) may direct the engagement and/or disengagement of the build module with the processing chamber. The controller(s) may direct transiting the build module to a further processing station (e.g., a polishing, heat treatment, or an unpacking station). The controller(s) may direct movement (e.g., vertical translation) of the platform. The controller(s) can direct the one or more lasers to generate the one or more laser beams (e.g., laser beams). The controller(s) may regulate the one or more aspects (e.g., characteristics)

of the laser beams (e.g., wavelength range, laser power, power density, speed, dwell time, intermission time, focus, cross-section, pulsing frequency, and/or irradiating as a continuous beam). The controllers can control the laser source (e.g., by controlling its power). The controller(s) may control the position(s) of the one or more laser beams with respect to the platform (e.g., control the trajectory of the energy beam). For example, the controller(s) may control the optical element(s) (e.g., lenses, mirrors, beam-splitters, and/or scanners). The controller(s) may control the operation of one or more valves of the printer (e.g., for controlling the flow of gas), such as by directing the valve(s) to open or close based on predetermined conditions. The valves may comprise pinch valves. The controller(s) may control the velocity of the flow of gas within the processing chamber (e.g., via the valve(s) or nozzle(s)). The controller(s) may control the operation of one or more sensors of the printer (e.g., for sensing a pressure within the processing chamber), such as by directing the sensors to turn on or off based on predetermined conditions. The sensor may be position sensors to determine positions of one or more of the components (e.g., vertical position of the platform). The controller(s) may control the operation of the layer forming device (e.g., any of its components), such as by directing movement (e.g., translation) of the layer forming device. The controller(s) may control the operation of the one or more pumps, such as by directing the pump(s) to turn on or off based on predetermined conditions. The controller(s) may control locking and/or unlocking of doors and/or windows of the enclosure (e.g., processing chamber). The controller(s) may control aspects of software of the printer (e.g., printing directions). The controller may direct operations based on a control scheme (e.g., feedback and/or feedforward control). The control may direct operations based open loop control and/or closed loop control scheme.

The 3D printer can include any suitable number of controllers, and can be used to control any number of suitable (e.g., different) operations. For example, in some embodiments, one or more controllers is used to control one or more components and another one or more controllers is used to control another one or more components. In some embodiments, a number of controllers are used to control one component. In some embodiments, a controller (e.g., a single controller) used to control a number of components. For example, in some embodiments, one or more controllers is used to control the laser(s), and another one or more controllers is used to control aspects of the flow of gas (e.g., velocity). Control may comprise regulate, manipulate, restrict, direct, monitor, adjust, attenuate, maintain, modulate, or manage.

Figure 13:
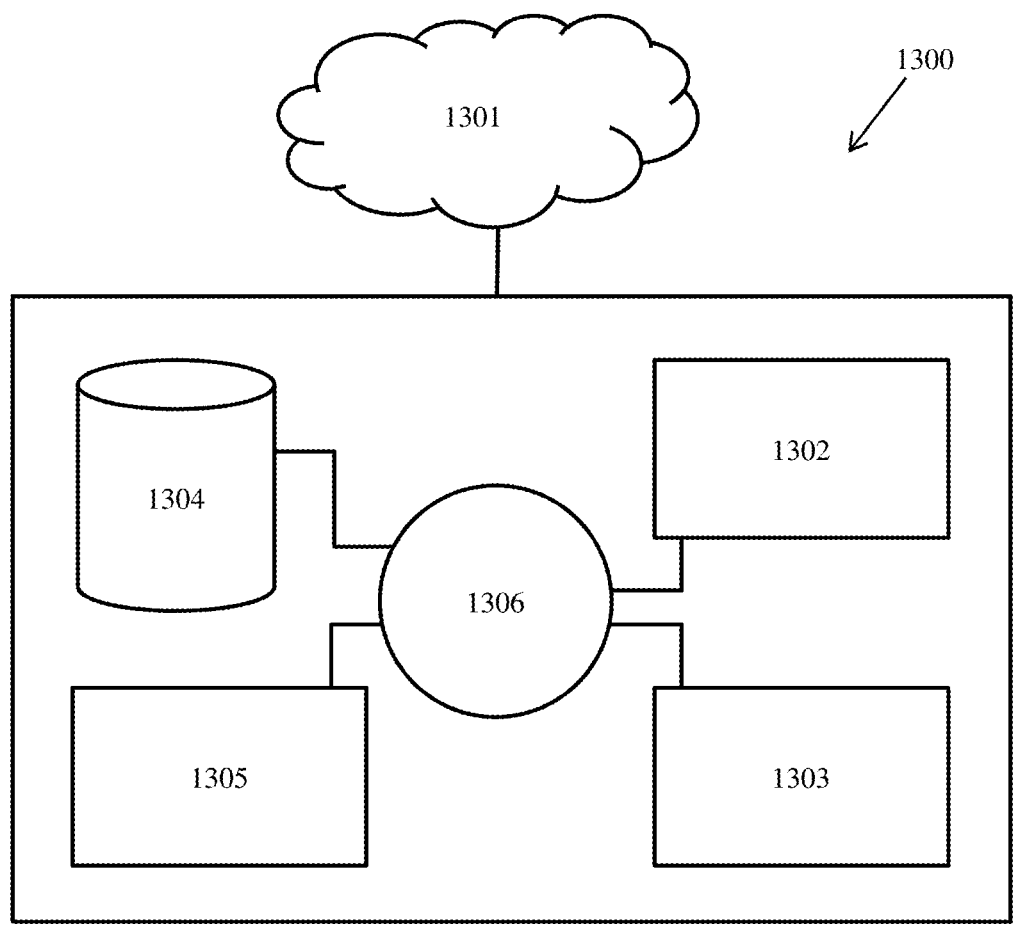
FIG. 13 schematically illustrates a computer system.

The printers described herein can include, or be in communication with, a computer system that may be operatively coupled to the one or more controllers. FIG. 13 schematically illustrates an example computer system 1300 in accordance with some embodiments. The computer system can include a processing unit (e.g., FIG. 13, 1306) (also referred to herein as a "processor," "computer" or "computer processor"), a memory (e.g., FIG. 13, 1302) (e.g., random-access memory, read-only memory, and/or flash memory), an electronic storage unit (e.g., FIG. 13, 1304) (e.g., hard disk), communication interface (e.g., FIG. 13, 1303) (e.g., network adapter) for communicating with one or more other systems, and peripheral devices (e.g., FIG. 13, 1305), such as cache, other memory, data storage and/or electronic display adapters. The memory storage unit interface, and peripheral devices can be in communication with the processing unit through a communication bus, such as a motherboard. The storage unit can be a data storage unit (or data repository) for storing data. The computer system can be operatively coupled to a computer network ("network") (e.g., FIG. 13, 1301) with the aid of the communication interface. Instructions may be stored in the memory and can be directed to the processing unit, which can subsequently program or otherwise configure the processing unit to implement methods described herein. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. The storage unit can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet. The computer system can communicate with one or more remote computer systems through a network. For instance, the computer system can communicate with a remote computer system of a user (e.g., operator). Examples of remote computer systems include personal computers, tablet computers, telephones, smart phones, or personal digital assistants. Methods as described herein can be implemented by way of machine (e.g., computer processor) executable code stored on an electronic storage location of the computer system, such as, for example, on the memory or electronic storage unit. The machine executable or machine-readable code can be provided in the form of software. During use, the processor can execute the code. In some cases, the code can be retrieved from the storage unit and stored on the memory for ready access by the processor. In some situations, the electronic storage unit can be precluded, and machine-executable instructions are stored on the memory.

The printers described herein can include one or more power supplies to supply power to any of the components. The power can be supplied by a grid, generator, local, or any combination thereof. The power supply can be from renewable or non-renewable sources. The renewable sources may comprise solar, wind, hydroelectric, or biofuel. The power supply can comprise rechargeable batteries.

Example 1

Figure 14A:
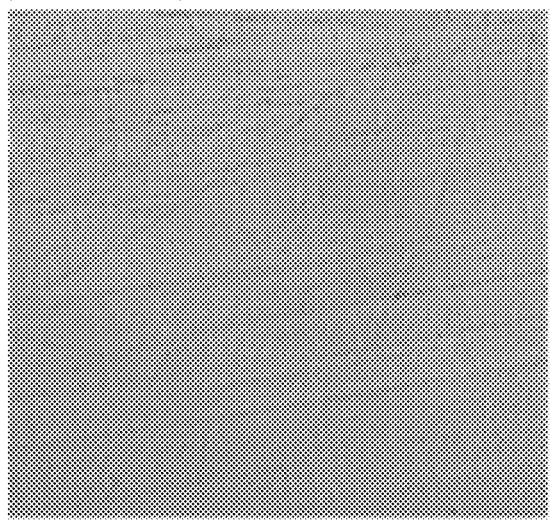
FIGS. 14A-14D show sections of 3D objects.
Figure 14B:
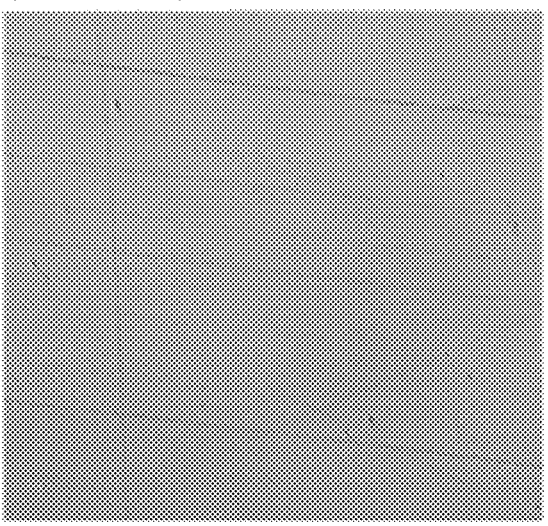
Figure 14C:
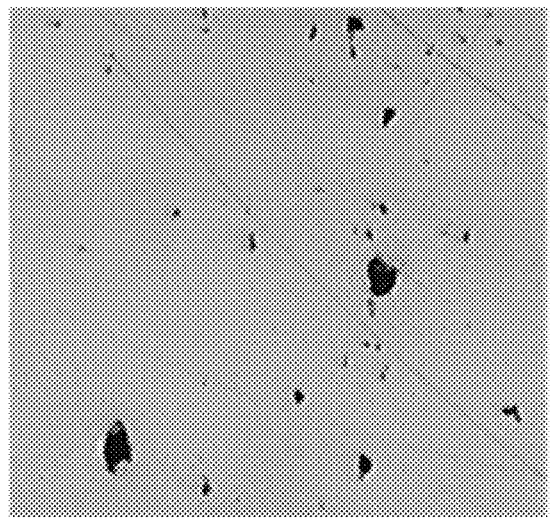
Figure 14D:
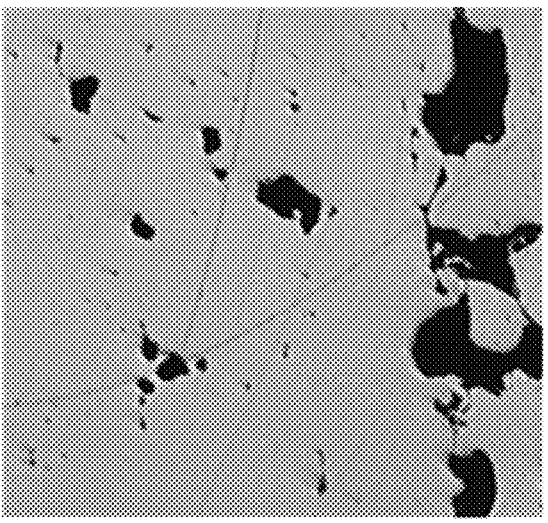

In a 25 cm by 25 cm by 30 cm container at ambient temperature and pressure, 1718 powder of average particle size 35 µm is deposited in a container accommodating a powder bed. The container is disposed in an enclosure. The enclosure is purged with Argon gas. A 1064 diode laser was used to melt a portion of the powder bed and generate four 3D objects. FIGS. 14A-14D show images of the resultant 3D objects using a Nikon EPIPHOT 300 microscope. The object of FIG. 14A was formed using a laser beam fluence 18.8 kW/mm$^2$ and energy density (at the powder bed) of 2.8 J/mm$^2$. The objects of FIGS. 14B-14D were formed using progressively lower laser beam fluence and/or energy density. The objects of FIGS. 14B-14D show increasing amounts of lack of fusion porosity.

Example 2

Figure 15:
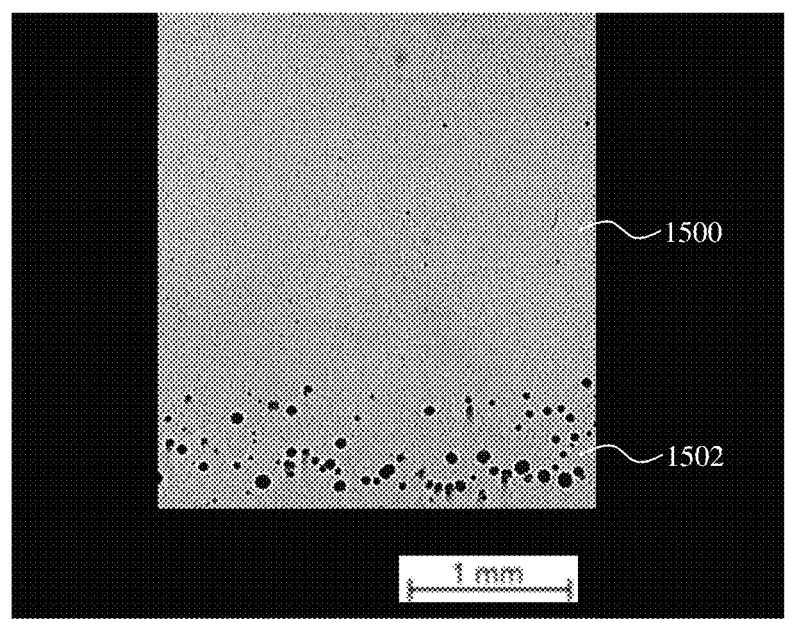
FIG. 15 shows a section of a 3D object.

In a 25 cm by 25 cm by 30 cm container at ambient temperature and pressure, 1718 powder of average particle size 35 μm is deposited in a container accommodating a powder bed. The container is disposed in an enclosure. The enclosure is purged with Argon gas. A 1064 diode laser was used to melt a portion of the powder bed and generate a 3D object. FIG. 15 shows an image of the resultant 3D object using a Nikon EPIPHOT 300 microscope. The 3D object has a first portion 1500 formed using a first laser beam intensity (laser power 240 Watts, spot size 113 micrometers) and a second portion 1502 formed using a second laser beam intensity (laser power 160 Watts, spot size 75 micrometers). The second portion has spherically shaped pores related to keyholing. The second portion has a higher porosity than the first portion of the 3D object.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. An apparatus for printing a three-dimensional object, the apparatus comprising:
one or more controllers configured to (a) couple to an electrical power source and operatively couple with an elevator coupled to a platform configured to support a powder bed comprising a powder material, a layer forming device, a gas flow system, and a galvanometer scanner; (b) direct the elevator to translate the platform in the second direction, (c) direct the layer forming device to translate in a first direction to generate the powder bed, and (d) direct the galvanometer scanner to direct an energy beam to impinge at an exposed surface of the powder bed and translate across the exposed surface in accordance with a path to print the three-dimensional object; and (e) direct the gas flow system to provide a flow of gas in an internal volume of an enclosure such that the flow of gas provides a stream of particles that progressively deposits an optical mask on an internal surface of a window through which the energy beam traverses into the enclosure, the window being coupled to a wall of the enclosure, the internal surface of the window facing an interior of the enclosure, the optical mask progressively absorbing energy from the energy beam and modifying a peak power density of the energy beam during the printing, the optical mask causing the peak power density of the energy beam to vary by (i) at least 5% after printing 3,000 $cm^3$ of material as compared to a variation of the peak power density of the energy beam transmitted through the window excluding the optical mask and (ii) at least 10% after printing 5,000 $cm^3$ of the material as compared to the variation of the peak power density of the energy beam transmitted through the window excluding the optical mask, the three-dimensional object being printed in the enclosure in which the platform and the powder bed are disposed.

2. The apparatus of claim 1, wherein the one or more controllers are configured to facilitate deposition, or direct facilitating deposition, of the optical mask such that the optical mask causes the peak power density of the energy beam to increase during at least part of the printing.

3. The apparatus of claim 1, wherein the one or more controllers are configured to facilitate deposition, or direct facilitating deposition, of the optical mask such that the optical mask causes the peak power density of the energy beam to decrease during at least part of the printing.

4. The apparatus of claim 1, wherein during the printing, the apparatus is configured to direct printing at least about five (5) cubic centimeters of material per hour.

5. The apparatus of claim 1, wherein the one or more controllers are configured to control, or direct control of, the variation in the peak power density of the energy beam in accordance with one or both of (i) and (ii) is associated with generating regions of a porosity within the three-dimensional object during printing and/or (b) surface roughness on the three-dimensional object.

6. The apparatus of claim 1, wherein the one or more controllers are configured to control, or direct control of, the variation in the peak power density of the energy beam in accordance with one or both of (i) and (ii) is associated with generating regions of surface roughness on the three-dimensional object during the printing.

7. The apparatus of claim 1, wherein the one or more controllers are configured to control, or direct control of, the gas flow system such that the stream of the particles includes particles that become entrained within the flow of gas are at or above the exposed surface of the powder bed.

8. The apparatus of claim 1, wherein the one or more controllers are operatively coupled with the gas flow system, the one or more controllers being configured to control a velocity of the stream of the particles.

9. The apparatus of claim 8, wherein the one or more controllers are configured to control, or direct control of, the velocity of the stream of the particles in real time during the printing of the three-dimensional object.

10. The apparatus of claim 1, wherein the one or more controllers are configured to direct generation of at least about five (5) milligrams per second (mg/sec) of gas-borne particles during the printing.

11. The apparatus of claim 1, wherein the one or more controllers are configured to control, or direct control of, the gas flow system to facilitate a turbulent movement of the stream of the particles in the internal volume of the enclosure; optionally wherein (I) a wall of the enclosure and/or (II) a baffle in the enclosure, is configured to facilitate the turbulent movement of the stream of the particles; and optionally wherein (III) the wall of the enclosure and/or (IV) the baffle in the enclosure, is normal or substantially normal to the internal surface of the window.

12. The apparatus of claim 11, wherein the one or more controllers are configured to control, or direct control of, the gas flow system such that the turbulent movement is directly adjacent to the window; and optionally wherein (I) the window is disposed in a recessed portion of the enclosure, and (II) a side wall of the recessed portion at least in part causes the turbulent movement of the stream of the particles to preferentially deposit particles on a select region of the internal surface of the window.

13. The apparatus of claim 1, wherein the one or more controllers are configured to control, or direct control of, the gas flow system such that the gas flow system provides the flow of gas at a substantially constant velocity within the enclosure during the printing.

14. The apparatus of claim 1, wherein the one or more controllers are configured to control, or direct control of, the gas flow system such that the flow of gas has a velocity ranging from about 0.2 to about 2 meters per second (m/sec).

15. The apparatus of claim 1, wherein the one or more controllers are configured to control, or direct control of, the gas flow system comprising particles within the stream of the particles having at least about 10% metal oxide by volume.

16. The apparatus of claim 1, wherein the one or more controllers are configured to control, or direct control of, the energy beam such that the variation of the peak power density of the energy beam in accordance with one or both of (i) and (ii) is associated with forming a first region of the three-dimensional object having (I) a first porosity of greater than about 1% and a second region of the three-dimensional object having a second porosity of about 1% or less and/or (II) a first surface roughness of greater than about 50 micrometers and a second region of the three-dimensional object having a second surface roughness of at most about 50 micrometers.

17. The apparatus of claim 1, wherein the one or more controllers are configured to control, or direct control, of the energy beam to have a footprint at the exposed surface, the footprint having a power density distribution comprising a lower power density at a central region of the footprint as compared to a rim of the footprint.

18. The apparatus of claim 1, wherein the one or more controllers are configured to control, or direct control of, the gas flow system such that the flow of gas has a peak horizontal velocity at a distance of about 15 to about 100 millimeters (mm) above the exposed surface of the powder bed.

* * * * *